United States Patent [19]
Kitama et al.

[11] Patent Number: 5,205,206
[45] Date of Patent: Apr. 27, 1993

[54] FOOD PRODUCTION APPARATUS

[75] Inventors: Shozo Kitama, Sakai; Hiroshi Yoshikawa; Akimitsu Kanemaki, both of Fukui, all of Japan

[73] Assignee: Kabushiki Kaisha JNT, Fukui, Japan

[21] Appl. No.: 867,605

[22] Filed: Apr. 13, 1992

[30] Foreign Application Priority Data

| Apr. 12, 1991 [JP] | Japan | 3-80185 |
| Apr. 16, 1991 [JP] | Japan | 3-84153 |
| Oct. 25, 1991 [JP] | Japan | 3-279623 |

[51] Int. Cl.$^5$ .............. A23L 1/216; A23P 1/00; A47J 37/12
[52] U.S. Cl. ................... 99/326; 99/330; 99/348; 99/353; 99/357; 99/407; 99/409
[58] Field of Search .......... 99/325–327, 99/330, 331, 335, 353, 355, 356, 357, 403–408, 443 C, 483, 430, 536; 426/438, 509, 516; 222/372; 221/150 R, 150 A, 150 HC; 366/167, 168, 144

[56] References Cited

U.S. PATENT DOCUMENTS

| 3,695,171 | 10/1972 | Hartley et al. | 99/407 |
| 4,312,265 | 1/1982 | Enterline et al. | 99/348 |
| 4,361,083 | 11/1982 | Natusch | 99/483 |
| 4,438,683 | 3/1984 | Bartfield | 99/330 |
| 4,450,588 | 5/1984 | Bartfield . | |
| 4,454,804 | 6/1984 | McCulloch | 99/353 |
| 4,590,850 | 5/1986 | Hendenberg | 99/467 |
| 4,618,073 | 10/1986 | Bartfield et al. . | |
| 4,646,627 | 3/1987 | Bartfield et al. | 99/404 |
| 4,711,165 | 12/1987 | Codino | 99/355 |
| 4,815,959 | 3/1989 | Stoeckli et al. | 99/353 |
| 4,957,042 | 9/1990 | van Lengerich | 99/348 |
| 4,984,514 | 1/1991 | van Lengerich | 99/353 |

FOREIGN PATENT DOCUMENTS

| 1510814 | 9/1989 | U.S.S.R. | 99/353 |
| 1273154 | 5/1972 | United Kingdom | 99/353 |

Primary Examiner—Timothy F. Simone
Attorney, Agent, or Firm—Wendroth, Lind & Ponack

[57] ABSTRACT

This invention relates to a food production apparatus which is preferably used in the preparation of foods such as fried potatoes. In the invention, powder obtained by pulverizing and drying potatoes or the like is provided with water and stirred, and the resulting mixture is extruded to be formed into a predetermined shape. In the invention the mixture of the powder and water is shaped by extruding it through extrusion holes communicating with a mixing chamber, and the shaped mixture which has been extruded from the shaper is then heated. According to the invention, the food is able to be prepared at a desired time and food which has just been prepared is able to be provided in the apparatus. Further, the powder can be preserved for a long time without lowering its freshness, and the powder is mixed with water and shaped as a food material rapidly at a desired time.

13 Claims, 21 Drawing Sheets

FOOD PRODUCTION APPARATUS

BACKGROUND OF THE INVENTION

1. Field of the Invention

This invention relates to a food production apparatus which is preferably used in the preparation of foods such as fried potatoes. The invention includes extrusion shaping means in which powder obtained by pulverizing and drying potatoes or the like is provided with water and stirred, and the resulting mixture is extruded to be formed into a predetermined shape.

2. Description of the related art

Conventionally, in order to prepare foods such as fried potatoes, an apparatus is used which slices potato to form slices, and fries the slices while carrying them on a conveyor, transferring the slices through a storage bath for storing edible oil which has been previously heated to a predetermined temperature.

This prior art apparatus is constructed so as to process perishable foods such as potatoes, and therefore has a problem in that, when the apparatus is not operated for a prolonged period of time, the freshness of the potatoes is lowered, resulting in that the quality of produced foods is degraded. Since the apparatus is so constructed that slices carried on a conveyor are transferred through a storage bath, there is another problem in that the transfer path must be relatively long in order to sufficiently heat the slices, with the result that the apparatus becomes large in size.

Furthermore, in the prior art, when powder obtained by pulverizing and drying potatoes or the like is provided with water and mixed, and the resulting mixture is extruded to be formed into a predetermined shape, the series of these process steps cannot be performed by a single device. Accordingly, in the prior art apparatus a device for stirring and mixing powder and water, and an extrusion shaping device for extruding the resulting mixture to be formed into a predetermined shape are separately installed.

Therefore, this prior art apparatus has a problem in that, when a small amount of a mixture is extruded, the mixture sticks to the inner surface of a casing which constitutes a mixing chamber, resulting a low yield. In contrast, when a large amount of a mixture is extruded, the extruded mixture may become rotten unless all portions of the extruded mixture is immediately further processed, e.g., fried.

A prior art apparatus for preparing foods such as cookies using a mixture of powder, such as wheat flour, and water, is independently provided with a stirring and mixing device for stirring and mixing the powder and a water, and shaping device for forming the mixture obtained by the stirring and mixing device into a predetermined shape. In this prior art apparatus, the operator carries the mixture obtained by the stirring and mixing device to supply it to the shaping device, and then collects the shaped mixture which has been extruded through extrusion holes, and thereafter the collected mixture is heated to be baked by a heating device such as an oven, which is separately installed.

In the prior art apparatus, since the stirring and mixing device and the shaping device are independently installed, the operator must carry the mixture obtained by the stirring and mixing device to supply it to the shaping device as described above. This requires much labor and causes the productivity to be low. Moreover, since the stirring and mixing device and the shaping device are constructed in a relatively bulky size, there is a problem in that they occupy a large space in a factory or the like.

SUMMARY OF THE INVENTION

Therefore, it is an object of the invention to provide a food production apparatus which can be constructed in a compact size and can prepare foods without lowering the quality of the foods even after the preparation of the foods has been suspended for a long period of time.

It is another object of the invention to provide an extrusion shaping apparatus for a food material in which the series of processes of stirring powder and water to mix them and extruding the resulting mixture to form it into a predetermined shape can be performed by a single apparatus, and, even when a small amount of the material is processed, to prevent the yield from degrading.

It is a further object of the invention to provide a food production apparatus for preparing foods which can be constructed in a compact size and which improves the productivity.

The food production apparatus of the invention is characterized in comprising a shaping device for adding water to powder supplied from a hopper to a mixing chamber, for stirring the powder and water, and for extruding the mixture of the powder and water from extrusion holes communicating with the mixing chamber to shape the mixture. The food production apparatus further comprises a heating device for heating the shaped mixture extruded from the shaping device.

The food production apparatus of the invention is characterized in that the shaping device comprises a cylindrical casing including the mixing chamber, which opens downward. A screw conveyor is provided for transferring powder introduced from the hopper into the casing, toward the mixing chamber. A blade member is driven to rotate in forward and reverse directions about a rotation axis in the mixing chamber, and vertically moves along the rotation axis; A shutter member has a water supply unit and an extrusion unit, the water supply unit including a water supply hole for supplying water to the mixing chamber in a process of adding water, the extrusion unit being communicated with the water supply unit and provided with the extrusion holes, and the shutter member being movable between a first position in which the water supply hole opens in the mixing chamber and a second position in which the extrusion holes open in the mixing chamber. A driving device displaces the shutter member between the first and second positions.

The food production apparatus of the invention is further characterized in that the heating means comprises a storage bath for storing a liquid such as water or oil. A temperature regulating device heats the liquid in the storage bath and maintains the temperature of the liquid at a predetermined value. A scooping member, which is disposed in the storage bath so as to be liftable above and below the level of the liquid, has openings smaller than the mixture immersed in the liquid. A circular like wire net also has openings smaller than the mixture for receiving the mixture. A sweeping member is driven to reciprocate in predetermined directions along the upper surface of the scooping member when the scooping member is positioned at the upper limit position, higher than the level of the liquid.

According to the invention, since powder accommodated in the hopper is mixed with water and then shaped, and the shaped mixture is heated by the heating device, the powder can be preserved for a long period of time. Therefore, the mixture can be shaped and heated at a desired time, and can be prepared at a desired time. The food production apparatus according to the invention can be advantageously used in a so-called automatic vending machine, whereby foods that have been just prepared can be supplied at a desired time.

Moreover, according to the invention, since powder and water supplied into the mixing chamber of the casing are mixed by a blade member to obtain a mixture, and the mixture is extruded through the extrusion holes and shaped, the apparatus can be constructed in a reduced size, and does not require a large space for installation. Accordingly, the food production apparatus of the invention can be widely used as, for example, a so-called automatic vending machine.

Furthermore, the apparatus of the invention is constructed in such a manner that the mixture is heated by a liquid which is maintained at a predetermined temperature by the temperature regulating device. The heated mixture is raised above the level of the liquid by the scooping member, and the heated mixture is swept out in a predetermined direction by the sweeping member. Therefore, it is not necessary to install a conveyor or the like immersed in a liquid of a storage bath, as described in conjunction with the prior art. This also enables the apparatus to be constructed in a compact size.

In a preferred embodiment, the shaping device for a food material of the invention is characterized in comprising a cylindrical casing having a mixing chamber to which powder and water to be mixed are supplied. A bottom plate closes an opening of the casing which faces downward, the bottom plate being provided with a plurality of extrusion holes through which a mixture of the powder and water is extruded. A pair of shutter plates are respectively movably disposed along first and second surfaces of the bottom plate and have a plurality of through holes which can be communicated with the extrusion holes. The first surface faces the mixing chamber, and the second surface, being parallel with the first surface, facing toward the outside. A pressing member moves toward or recedes from the bottom plate in the casing, and is disposed in the casing so as to be rotatable about the shaft. A stirring member passes through the pressing member to project into the mixing chamber.

According to the invention, powder and water are stirred in the mixing chamber to be mixed, and after the shutter plates are displaced, the mixture is extruded from the extrusion holes to be shaped. Therefore, the process of extruding and shaping the mixture can be readily and rapidly performed. Since powder and water are separately supplied, the powder can be stored for a long period of time, and the freshness of the powder can be prevented from lowering.

According to the invention, moreover, it is not necessary to store materials in a freezer in order to prevent the reduction of freshness or rottenness from occurring, as is the case for commercial frozen foods. Hence, the apparatus of the invention can provide a desired amount of an extruded product at a desired time. It is not necessary to additionally provide a preserving device such as a freezer, and therefore the space for installing such a device is not required, with the result that the apparatus of the invention is very simple in construction and has a remarkably increased storage capacity. According to the embodiment, immediately after powder and water are directly supplied to the mixing chamber and stirred therein, the extrusion process is conducted, whereby the productivity of the extrusion products can be greatly improved and the mixture is maintained unexposed to the air, resulting in that dust is prevented from entering into the mixture. It is thus possible to attain a very high cleanness.

According to the invention, powder and water to be mixed are supplied to the mixing chamber in the casing. The powder and water are stirred by the stirring member to be mixed, and then pressed by the pressing member to be extruded from the extrusion holes of the bottom plate. More specifically, the stirring member is disposed so as to pass through the pressing member, and therefore the stirring member and the pressing member rotate during the stirring process. After the stirring process has been completed in this way, the pressing member is displaced toward the bottom plate. In this extrusion process, the through holes of the pair of shutter plates communicate with a plurality of extrusion holes formed in the bottom plate. By contrast, in the stirring process, the extrusion holes of the bottom plate are closed by the shutter plates so as to prevent the powder and water from entering into the extrusion holes when they have not yet been completely mixed with each other. Although a portion of the mixture which has been subjected to the previous extrusion process remains, sticking to the inside of an extrusion hole, the shutter plate disposed at the side of the second surface which faces the outside prevents the remaining portion of the mixture from dropping off. When the remaining portion of the mixture is left in the extrusion hole for a long period of time, it becomes dried. The dried portion of the mixture sticks to the mixture which is extruded into the extrusion hole in the succeeding extrusion process. Even if an extruded mixture to which the dried mixture portion sticks is heated to be processed, the resulting food product exhibits a feeling of foreign matter when eaten, with the result that the product quality is degraded. The shutter plate disposed on the second surface settles this problem.

In the another preferred embodiment, the food production apparatus of the invention is characterized in comprising a rotor provided with a plurality of through holes which are formed at regular intervals in the circumferential direction. A device intermittently drives the rotor to rotate about its rotating shaft in a predetermined direction, while stopping the rotation at each of a plurality of stopping positions which correspond to the intervals of the through holes. A supplying device for supplying the powder into one of the through holes is positioned at a supplying position. A blade member is disposed so as to be inserted into or removed from a through hole which is positioned at a mixing position which is downstream of the supplying position in the rotation direction of the rotor, the blade member being driven to rotate in forward and reverse directions while being inserted into the through hole and reciprocating upward and downward. A bottom plate on which the rotor is mounted is provided with a water supply hole and a communicating hole, the water supply hole opening in a through hole which is positioned at the mixing position, and the communicating hole opening in a through hole which is positioned at a shaping position, which is downstream of the mixing position in the rotation direction. A shaping member is detachably disposed on a lower surface of the bottom plate to close the communicating hole, and has a plurality of extrusion holes through which a mixture of powder and water stirred and mixed by the blade member at the mixing position passes. An extrusion member passes through a through hole positioned at the shaping position and the communicating hole and presses the mixture in the through hole, thereby extruding it from the extrusion holes.

According to the invention, the rotor supported on the bottom plate is intermittently driven by the rotation-driving device. When powder is supplied by the supplying device to the through hole located at the supplying position of the rotor, the rotor is rotated by the rotation-driving device by an angle corresponding to the interval of the paired through holes adjacent to each other, so that the through hole to which the powder has been supplied is located at the mixing position. The blade member is inserted into the through hole to which the powder has been supplied and is located above the mixing position. After water is supplied to the through hole from the water supply hole formed in the bottom plate, the blade member is driven to rotate in forward and reverse directions while reciprocating upward and downward, thereby stirring and mixing the powder and water.

After the powder and water have been mixed in the through hole above the mixing position to obtain a mixture, the blade member is raised and retracted from the through hole, and the rotor is again rotated by the rotation-driving device so that the through hole accommodating the mixture is located at the shaping position. Into the through hole accommodating the mixture and above the shaping position, the pressing member is inserted to press the mixture, whereby the mixture is extruded from the extrusion holes of the shaping member to be formed into a shape corresponding to that of the extrusion holes.

According to the invention, since shaped foods can be produced in this way by a single apparatus in a series of processes including the mixing of powder and water, it is not required to construct the apparatus in a large size, and to transport and supply the mixture to another place. Therefore, foods can be produced with little labor, and the productivity can be improved.

According to the invention, powder in the hopper is supplied to the mixing chamber, the mixture in the mixing chamber is provided with water and stirred, the mixture of powder and water is extruded from the extrusion holes to be shaped, and the shaped mixture is heated by the heating member, thereby producing foods.

According to the invention, moreover, powder from the hopper is supplied to the casing and then transferred to the mixing chamber by the screw conveyor arranged in the casing. During this process of supplying powder to the mixing chamber by the screw conveyor, the shutter member is located at the first position, and therefore water is supplied from the water supply hole of the water supply unit to the powder in the mixing chamber. The blade member in the mixing chamber reciprocates upward and downward while rotating in the forward and reverse directions about the rotation axis, so that the powder and water in the mixing chamber are stirred and mixed with each other. Then, the shutter member is displaced from the first position to the second position by the displacement-driving device, and the extrusion holes of the extrusion unit open in the mixing chamber. Under this state, the screw conveyor further transfers the powder introduced from the hopper toward the mixing chamber. This causes the mixture in the mixing chamber to be extruded through the extrusion holes. In this way, by driving the screw conveyor to rotate, the mixture can be extruded through the extrusion holes to be produced into shaped foods.

According to the invention, furthermore, a liquid such as water or oil is stored in a storage bath, and the temperature of the liquid is maintained at a predetermined value by the temperature regulating means. In the storage bath, the scooping member is disposed so as to be liftable above and below the level of the liquid. After the mixture supplied into the storage bath is heated, the scooping member is moved to the upper limit position which is higher than the level of the liquid, thereby scooping the mixture in the storage bath. Then, the sweeping member is displaced in a predetermined direction to sweep out the heated mixture on the scooping member.

In this way, according to the invention, the supplying means supplies powder into the through hole of the rotor, the rotor is rotated, the blade member stirs the powder and water to mix them, and then is thus obtained mixture is extruded from the extrusion holes. Therefore, the series of processes can be conducted continuously, and it is not necessary for the operator to carry a shaped mixture to another place as described in conjunction with the prior art. This surprisingly improves the productivity, and prevents the apparatus from becoming large. Accordingly, the present apparatus does not require a large space for installation, and can be widely used as, for example, an automatic vending machine or the like.

BRIEF DESCRIPTION OF THE DRAWINGS

Further objects, features, and advantages of the invention will be more explicit from the following detailed description taken with reference to the drawings, wherein.

DESCRIPTION OF THE PREFERRED EMBODIMENTS

Figure 1:
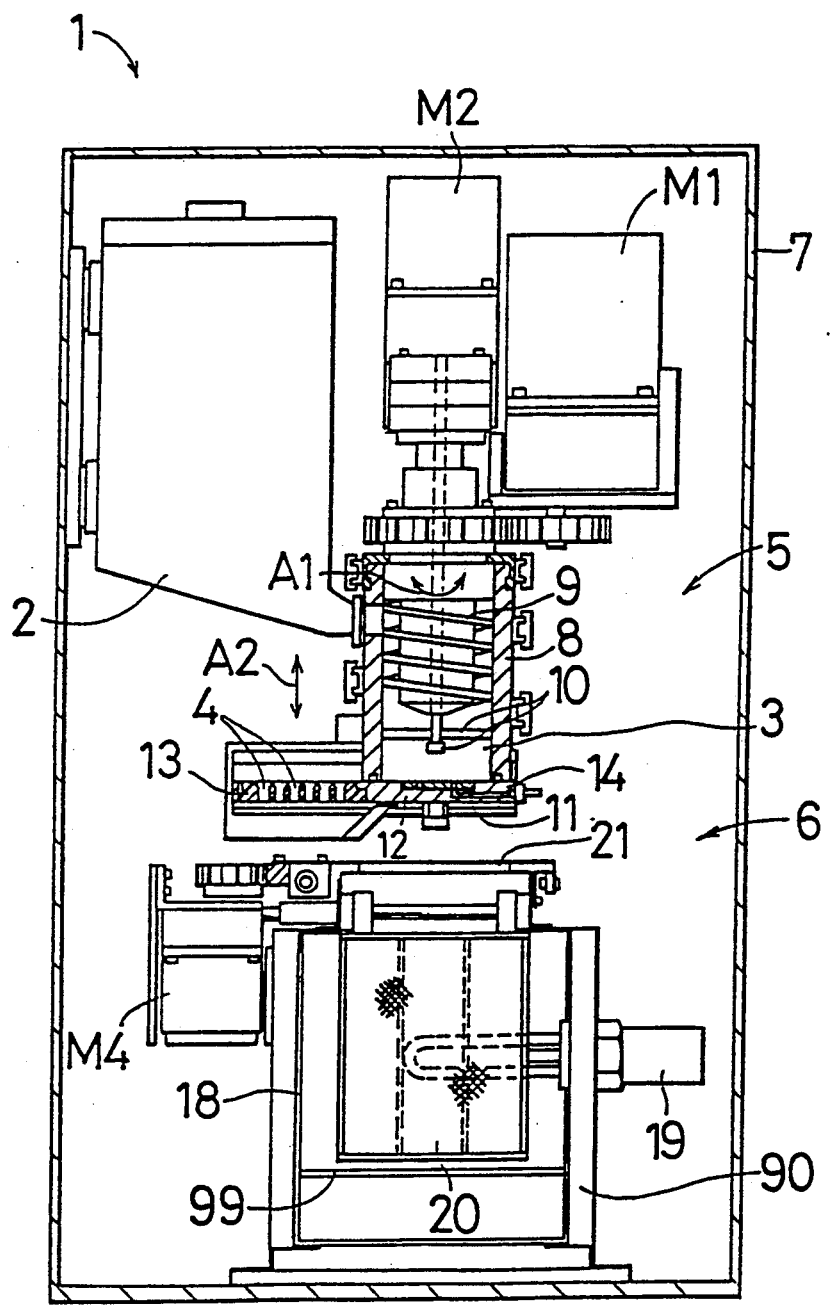
FIG. 1 is a sectional view illustrating the construction of an embodiment of the invention.

Now referring to the drawings preferred embodiments of the invention are described below.

EMBODIMENT 1

Figure 2:
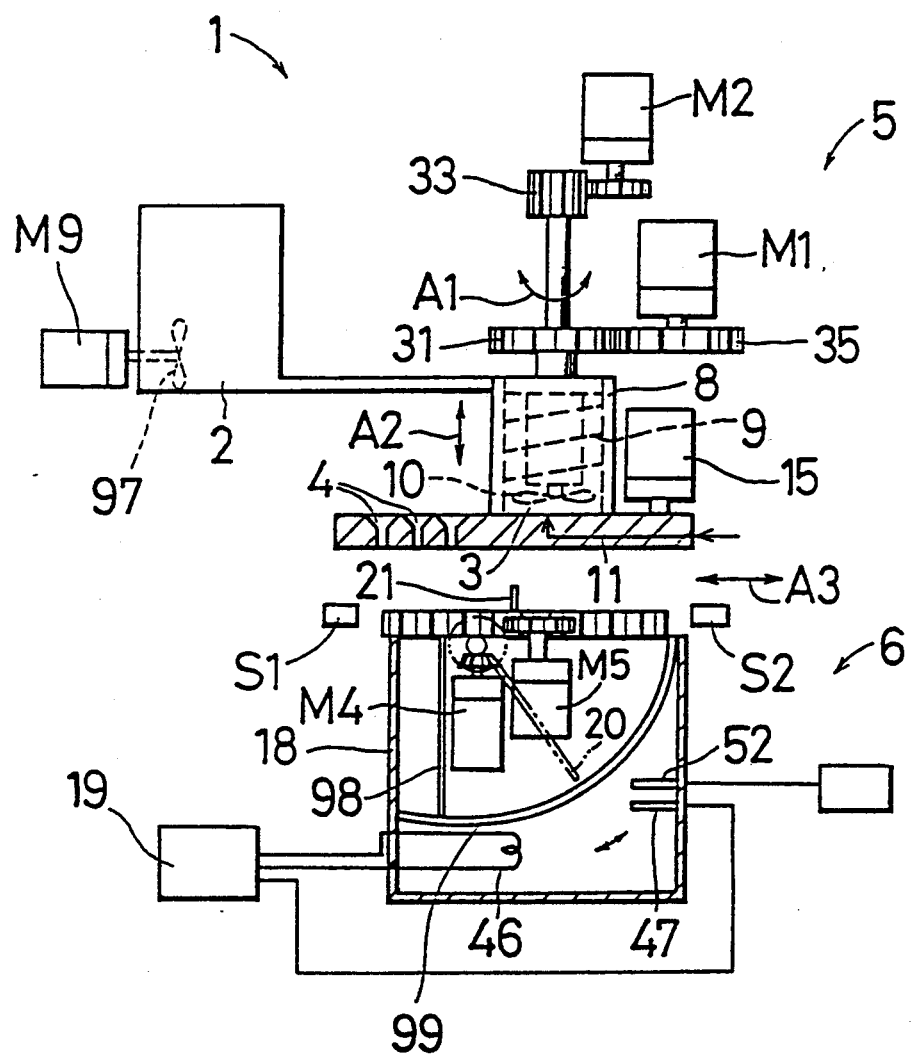
FIG. 2 is a diagram illustrating the embodiment of FIG. 1 in a simplified manner.
Figure 3:
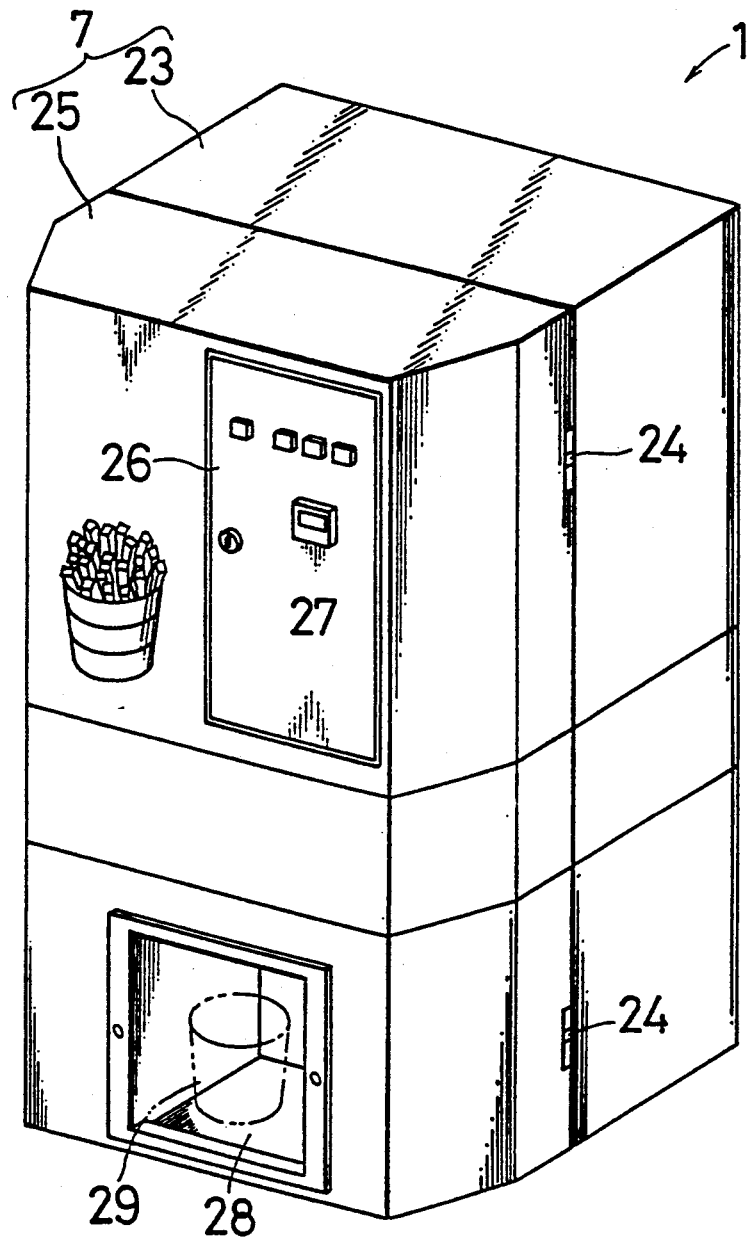
FIG. 3 is a perspective view illustrating the outer appearance of the food production apparatus of the embodiment.

The first embodiment is shown in FIGS. 1 to 8. FIG. 1 is a sectional view illustrating the whole construction of the embodiment, FIG. 2 is a diagram illustrating the embodiment of FIG. 1, and FIG. 3 is a perspective view illustrating the outer appearance of the embodiment. A food production apparatus 1 principally comprises a shaping device or shaper 5 in which powder supplied from a hopper 2 to a mixing chamber 3 is provided with water and stirred and the mixture of the powder and water is shaped by extruding it through extrusion holes 4 communicating with the mixing chamber 3, and a heating device or heater 6 for heating the shaped mixture which has been extruded from the shaper 5. The shaper 5 and the heater 6 are accommodated in a housing 7. The powder may be obtained by pulverizing and drying potato or the like, or may be powder of a chicken, etc.

The shaper 5 comprises a cylindrical casing 8 which opens downwardly. A screw conveyor 9 is driven to rotate at about 20 rpm so as to transfer powder introduced from a hopper 2 into the casing 8 toward the mixing chamber 3. A blade member 10 is driven to rotate in forward and reverse directions A1 at about 50 rpm about a rotation axis in the mixing chamber 3 and vertically moves in the direction of arrow A2 along the rotation axis. A shutter member 14 is made of a synthetic resin, and has a water supply unit 12 including a water supply hole 11 for supplying water to the mixing chamber 3 in a process of adding water and an extrusion unit 13 which is communicated with the water supply unit 12 and provided with the extrusion holes 4. A motor 15 is the driving device for driving the shutter member 14 so as to be displaced between a first position (the state shown in FIG. 1) in which the water supply hole 11 opens in the mixing chamber 3 and a second position in which the extrusion holes 4 open in the mixing chamber 3. In a preferred embodiment, a breaker 97, which is driven by a motor M9 to stir the powder in the hopper 2, may be provided.

The heater 6 comprises a storage bath 18 for storing liquid edible oil. A temperature regulator 19 regulates the temperature for heating the edible oil in the storage bath 18 and maintains its temperature at a predetermined temperature, e.g., about 180° C. A net-like scooping member 20 is disposed in the storage bath 18 so as to be liftable above and below the level of the edible oil and has openings smaller than the mixture extruded from the extrusion holes 4. A sweeping member 21 displaces in a predetermined direction A3 to sweep out the mixture lifted above the level of the edible oil by the scooping member 20. A wire net 99 and a wire net 98 are disposed in the oil storage bath 18 which receives the mixture and has openings smaller than the mixture so that, when the mixture is lifted by the scooping member 20, the mixture does not remain in the storage bath 18.

The housing 7 has a housing body 23 and a door 25 which is pivotably attached to the housing body 23 by a hinge 24. The door 25 is provided with a control panel 26 pivoted to the door 25. The control panel 26 is provided with a slot 27 for a coin or the like. A food outlet 28 is disposed on the door 25 and beneath the control panel 26. When a user of the apparatus 1 inserts one or more coins into the slot 27, a container 29, which is previously provided in the apparatus, is disposed in the outlet 28 so as to accommodate foods swept out by the sweeping member 21.

Figure 4:
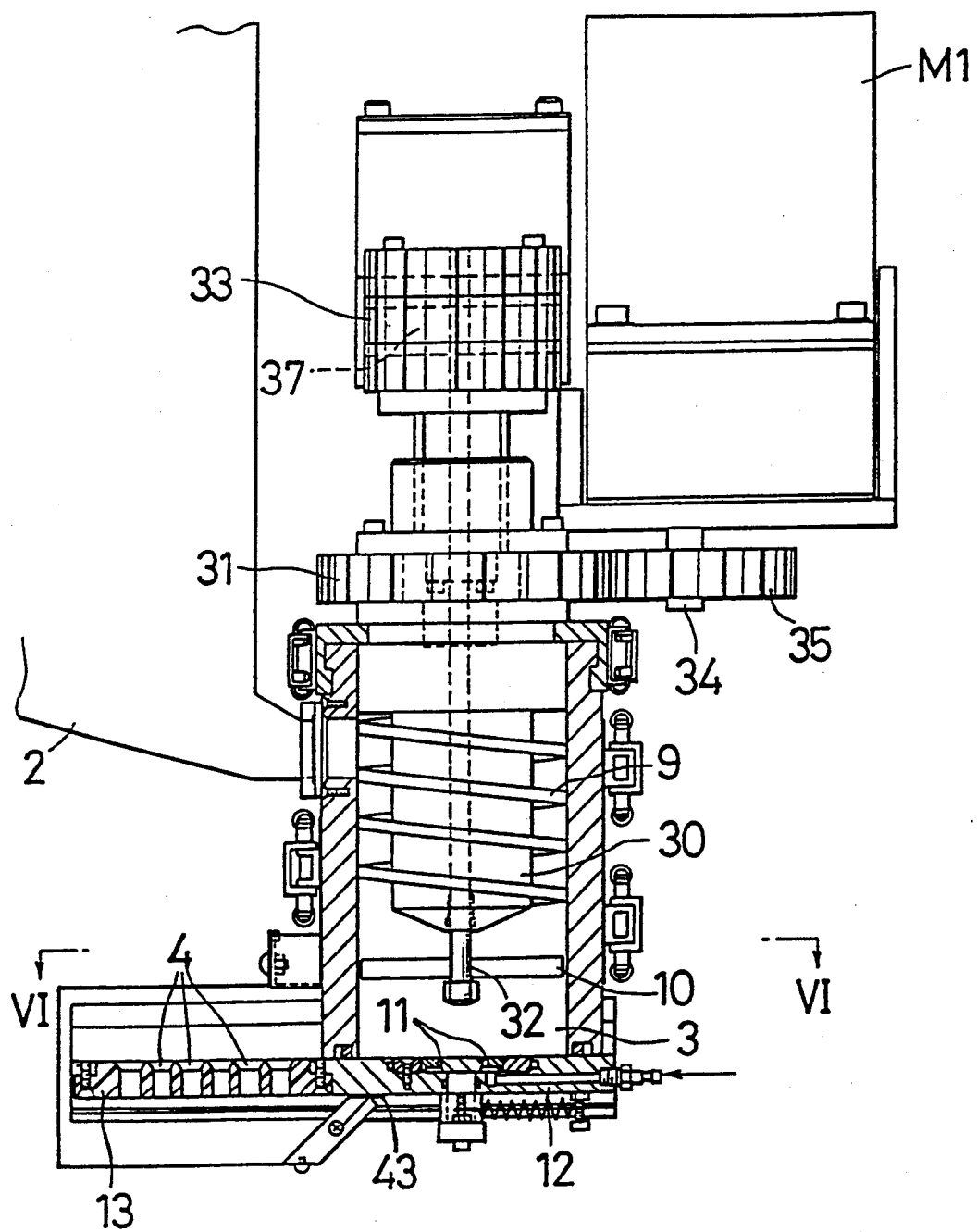
FIG. 4 is a sectional view illustrating the construction of a shaping device 5.
Figure 5:
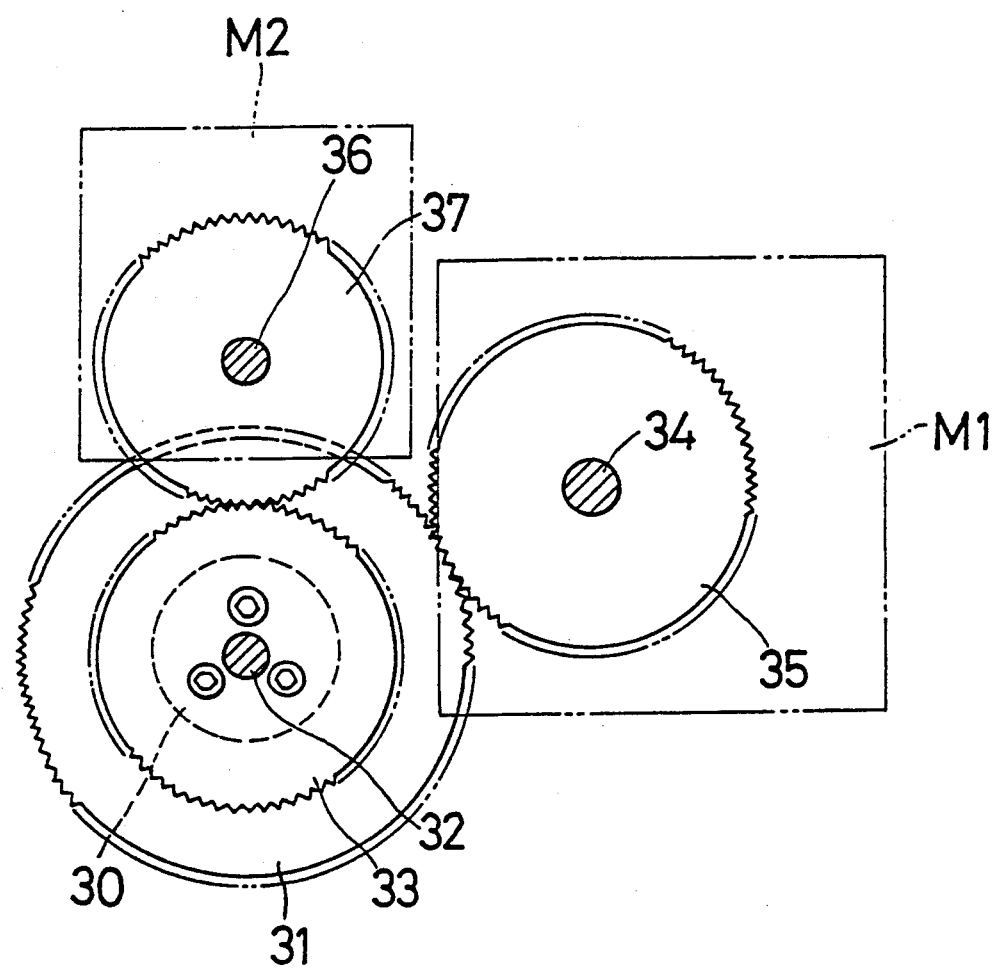
FIG. 5 is a sectional plan view of one portion of FIG. 4.

FIG. 4 is an enlarged sectional view illustrating the construction of the shaper 5, and FIG. 5 is a sectional plan view of one portion of FIG. 4 as viewed from above the shaper 5. A first gear 31 is coaxially fixed to a rotation shaft 30 of the screw conveyor 9, and a second gear 33 is fixed to a rotation shaft 32 which is movably inserted through the rotation shaft 30 in the shaft direction. The first gear 31 engages with a third gear 35 which is fixed to the output shaft 34 of a motor M1, and the second gear 33 engages with a fourth gear 37 which is fixed to the output shaft 36 of a motor M2. The blade members 10 are disposed at the lower end of the rotation shaft 32, which is movably inserted into the second gear 33 by passing through the rotation shaft 30 so as to receive only the turning force transmitted by the second gear 33.

Figure 6:
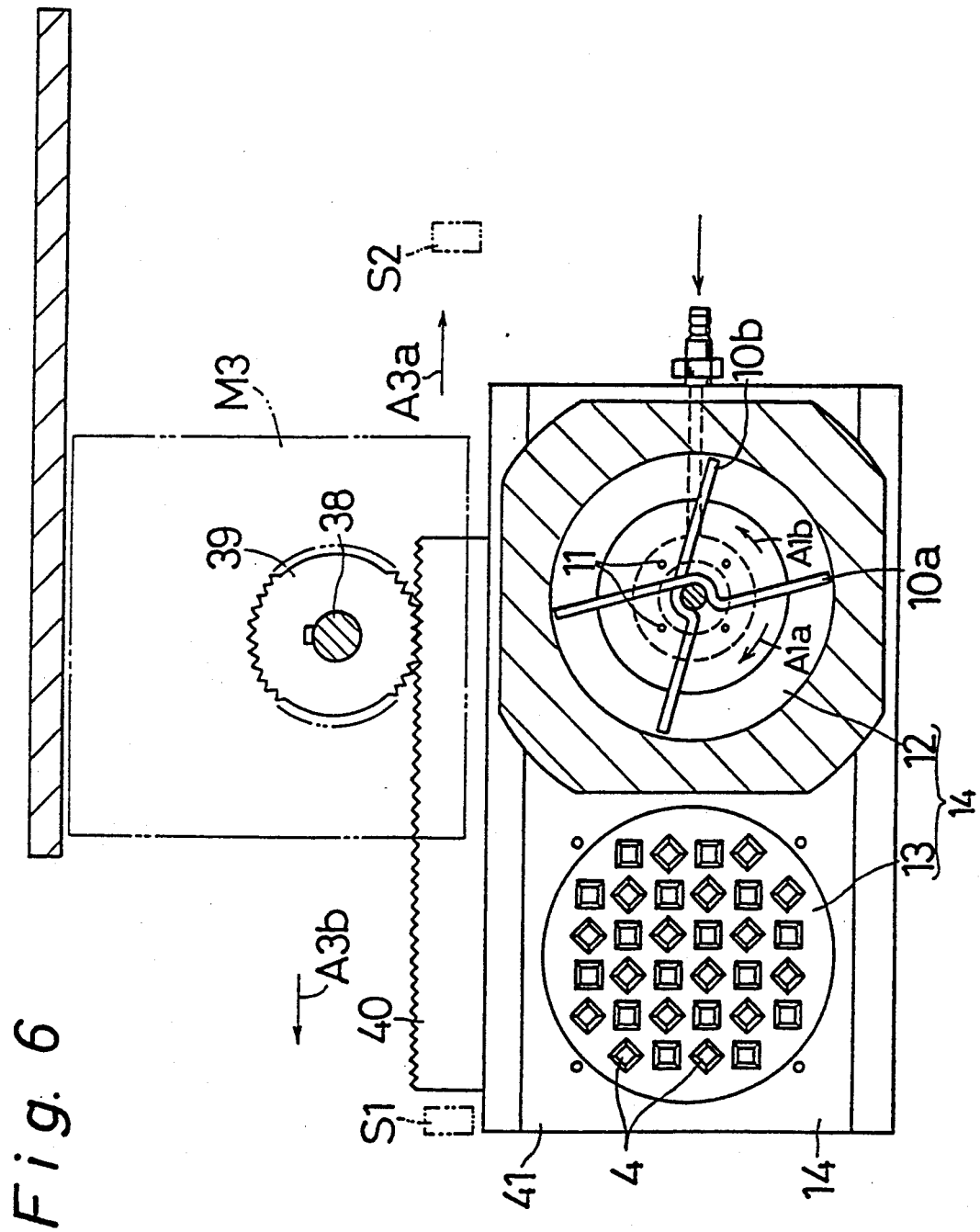
FIG. 6 is a sectional view taken along section line VI—VI of FIG. 4.

FIG. 6 is a sectional view taken along section line VI—VI of FIG. 4. The blade members 10 (the number of which is two in this embodiment) attached to the rotation shaft 32 are spaced in the shaft direction, and are constructed to perform a stirring operation as follows. When rotated in the forward direction A1a while vertically moving along the shaft direction, the lower blade member 10a directs the mixture in the mixing chamber 3 toward the radially inner portion and the upper blade member 10b directs the mixture toward the radially outer portion, and when rotated in the reverse direction A1b, the lower blade member 10a directs the mixture toward the radially outer portion and the upper blade member 10b directs the mixture toward the radially inner portion.

The water supply unit 12 of the shutter 14 is disposed under the thus constructed blade members 10. In advance of the stirring operation by the blade members 10, for example, city water is supplied from the water supply hole 11.

After powder and water are stirred and mixed in this way, a motor M3 is energized to rotate a pinion 39 fixed to the output shaft 38, whereby a rack 40 with which the pinion 39 engages is moved. This causes the shutter member 14 to be displaced in the direction of arrow A3a from the first position to the second position in which the extrusion unit 13 faces the internal space of the casing 8.

The extrusion holes 4 of the extrusion unit 13 have a rectangular section which is perpendicular to the shaft, and are formed so that a flat internal surface of one hole and a corner of an adjacent hole are closely arranged. This prevents portions of the mixture extruded adjacently through these extrusion holes 4 from adhering to each other. The extrusion unit 13 is made of, for example, a synthetic resin. The extrusion holes 4 may be formed into an arbitrary shape other than a rectangular shape. Therefore, the extrusion unit 13 is detachably attached by screws or the like to a base plate 41 of the shutter member 14. A magnetic sensor S1 detects the shutter member 14 being disposed in the first position, wherein the water supply unit 12 faces the mixing chamber 3, and another magnetic sensor S2 detects the shutter member 14 being disposed in the second position, wherein the extrusion unit 13 faces the mixing chamber 3. When the shutter member 14 is displaced in the direction of arrow A3a and the magnetic sensor S2 detects this displacement, the screw conveyor 9 is driven to rotate so that powder is supplied downwardly toward the mixing chamber 3. Due to the pressure of this powder, the mixture in the mixing chamber 3 is pressed through the extrusion holes 4 and hangs therefrom. When the shutter member 14 is displaced by the motor M3 in the direction of arrow A3b in that state, a cutting edge 43 (as shown in FIG. 4) which is elastically in contact with the lower surface of the shutter member 14 cuts off the portions of the mixture hanging from the extrusion holes 4. The shaped mixture portions which have been cut off in this way fall into the storage bath 18 of the heater 6.

Figure 7:
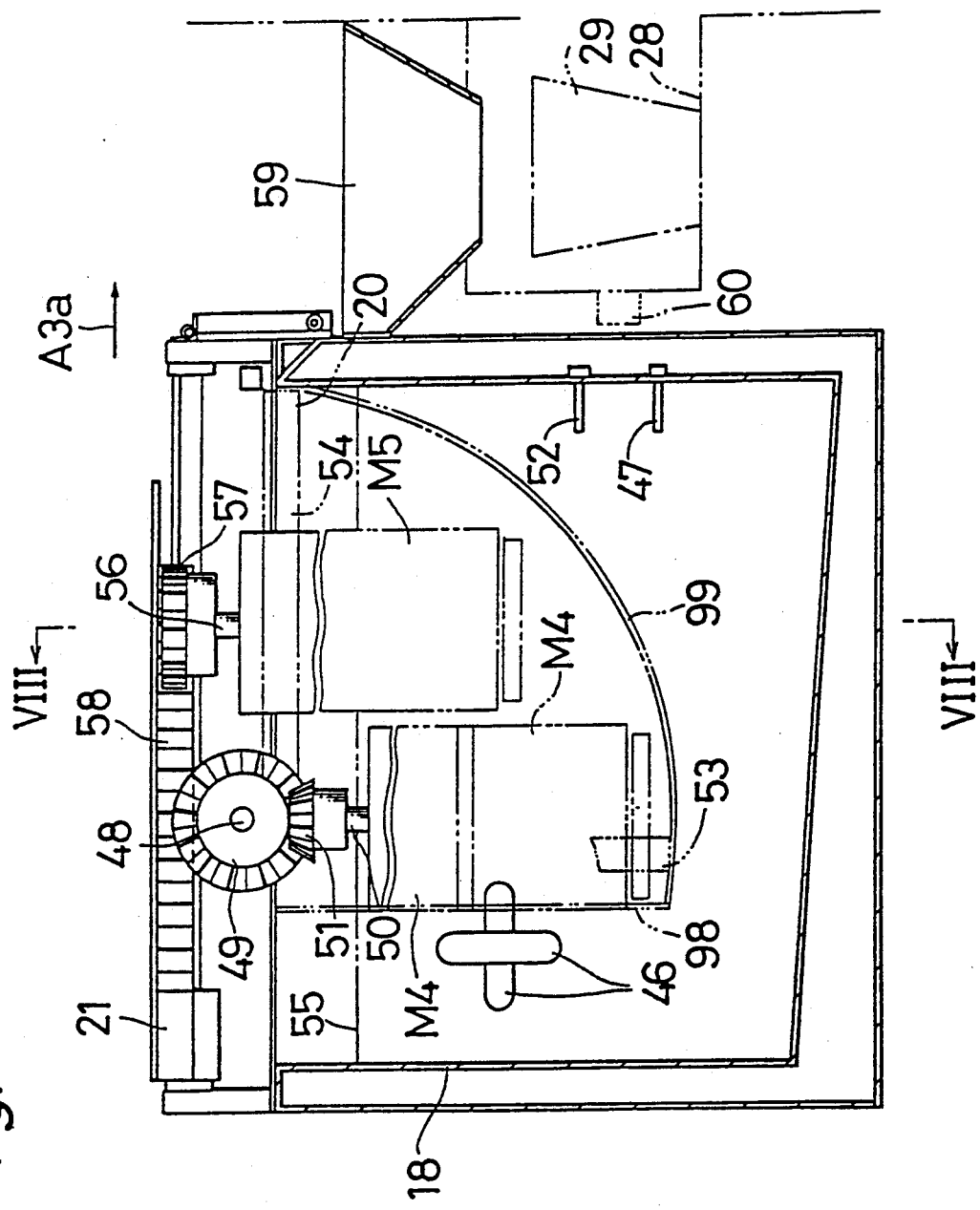
FIG. 7 is a sectional view illustrating a heating device 6.
Figure 8:
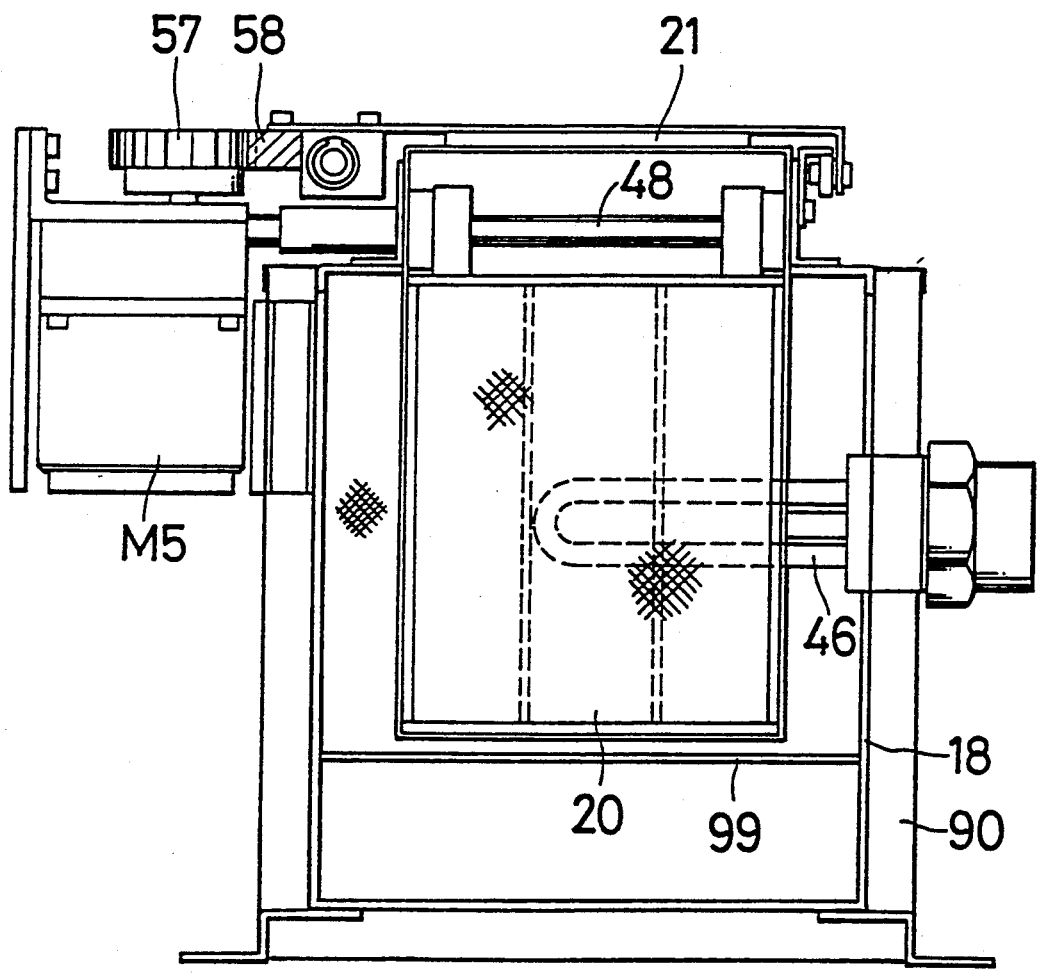
FIG. 8 is a sectional view taken along section line VIII—VIII of FIG. 7.

FIG. 7 is a sectional view illustrating the heater 6, and FIG. 8 is a sectional view taken along section line VIII—VIII of FIG. 7. A heating tube 46, which may be embodied by a heating wire, is disposed at one side of the storage bath 18. In accordance with a temperature detected by a temperature detector 47 of the temperature regulator 19, the heating tube 46 is supplied at every predetermined time with electric power of, for example, 1 kW, so that the temperature of the oil stored in the storage bath 18 is at a substantially constant value. In the storage bath 18, the scooping member 20 is disposed so as to be rotatable about a support shaft 48 by any angle. To one end of the support shaft 48, in the shaft direction, is fixed a bevel gear 49 which engages with a bevel gear fixed to an output shaft 50 of a motor M4. The storage bath 18 is provided with an oil level detector 52, which may be embodied by a thermistor. The oil level detector 52 can detect a low oil level caused by consumption of the oil. The storage bath 18 is detachably attached to a supporting frame 90 as shown in FIG. 1.

When the shaped mixture falls from the shape 5, the scooping member 20 is sunk below the oil level of the storage bath 18 as indicated by reference numeral 53. After a predetermined period of time has elapsed, the motor M4 is energized so that the scooping member 20 is raised above the oil level 55 as indicated by an imaginary line 54. In this state, a motor M5 is energized to rotate a pinion 57 fixed to an output shaft 56. This causes the sweeping member 21, to which a rack 58 is fixed, to be displaced in the direction of arrow A3a, so that the heated mixture on the scooping member 20 falls in a chute 59 to be accommodated in the container 29 disposed in the outlet 28. At this time, a container detector 60 checks to see whether or not the container 29 is positioned immediately beneath the chute 59. The container detector 60 may be composed of a light emitting element and a light receiving element so that, when the light emitted from the light emitting element is interrupted by the container 29, it is judged that the container 29 is disposed in the outlet 28, and, when the light emitted from the light emitting element is received by the light receiving element, it is judged that the container 29 is not disposed in the outlet 28. The apparatus may be so designed that, when the container detector 60 detects the container 29 as not being disposed in the outlet 28, the sweeping member 21 is not driven and remains in its stopped state.

In the embodiment described above, powder obtained by pulverizing and drying potatoes or the like is stored in the hopper 2. In a preferred embodiment of the invention, powder of a chicken may be used as the powder. In another embodiment of the invention, wheat flour is stored in the hopper and added with water in the mixing chamber 3 so as to produce noodles. In the alternative embodiment, it is preferable that the extrusion holes of the extrusion unit 13 of the shutter member 14 may be formed to have a circle section which is perpendicular to the axis so as to extrude the mixture into slender pieces, and the mixture shaped into noodles is boiled in the storage bath 18 which stores hot water of, e.g., 90° C. or more.

According to the invention described above, since powder accommodated in the hopper is mixed with water and then shaped and the shaped mixture is heated by the heating means, the powder can be preserved for a long period of time, and therefore the mixture can be shaped and heated at a desired time and can be prepared at an arbitrary time. This allows the food production apparatus according to the invention to be preferably used in a so-called automatic vending machine, whereby foods that have just been prepared can be supplied at a desired time.

Moreover, according to the invention, since powder and water supplied into the mixing chamber of the casing are mixed by the blade member to obtain a mixture, and the mixture is extruded through the extrusion holes and shaped, the apparatus can be constructed in a reduced size, and does not require a large space for installation. Accordingly, the food production apparatus of the invention can be widely used as, for example, a so-called automatic vending machine.

Furthermore, the embodiment is so constructed that the mixture is heated by a liquid which is maintained at a predetermined temperature by the temperature regulator, the heated mixture is raised above the level of the liquid by the scooping member, and the heated mixture is swept out in a predetermined direction by the sweeping member. Therefore, it is not necessary to install a conveyor or the like immersed in a liquid of a storage bath as described in conjunction with the prior art. This enables the apparatus to be constructed in a further compact size.

EMBODIMENT 2

Figure 9:
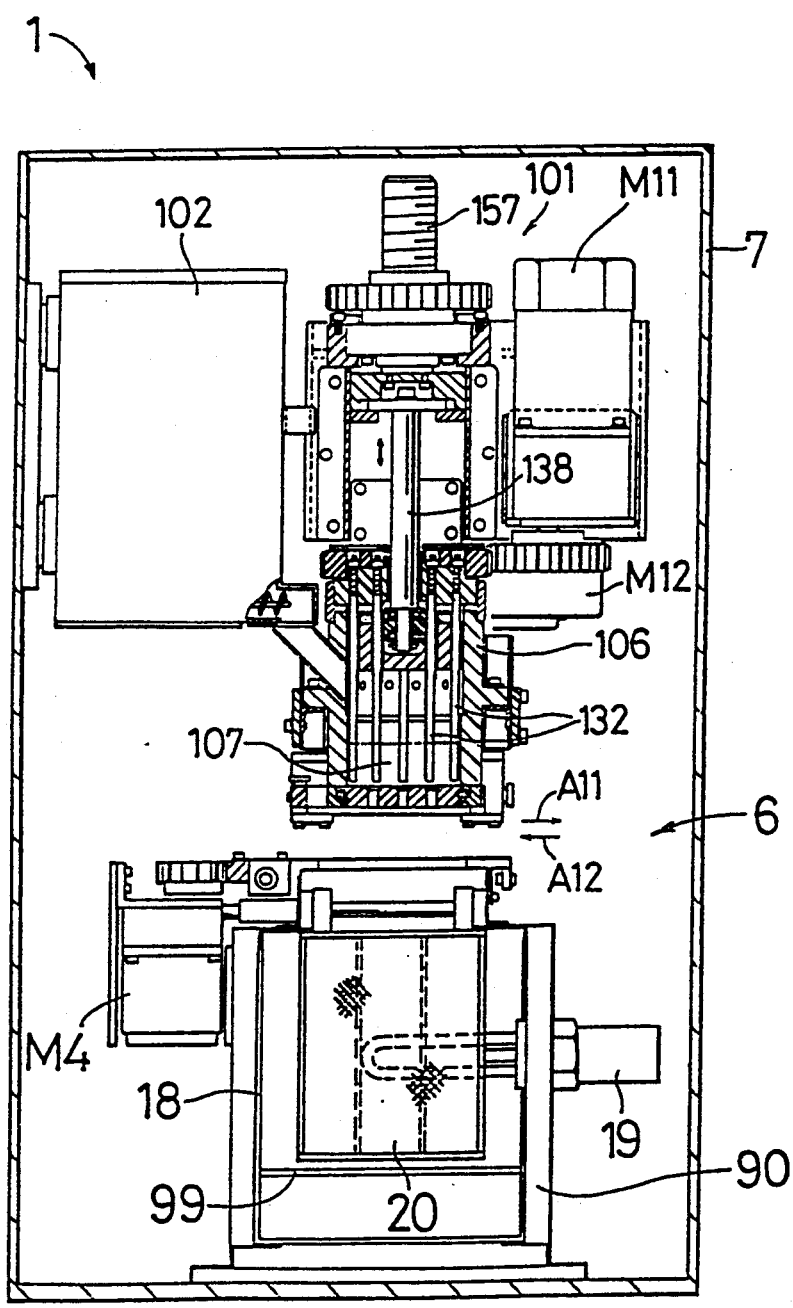
FIG. 9 is a sectional view illustrating the construction of a second embodiment of the invention.
Figure 10:
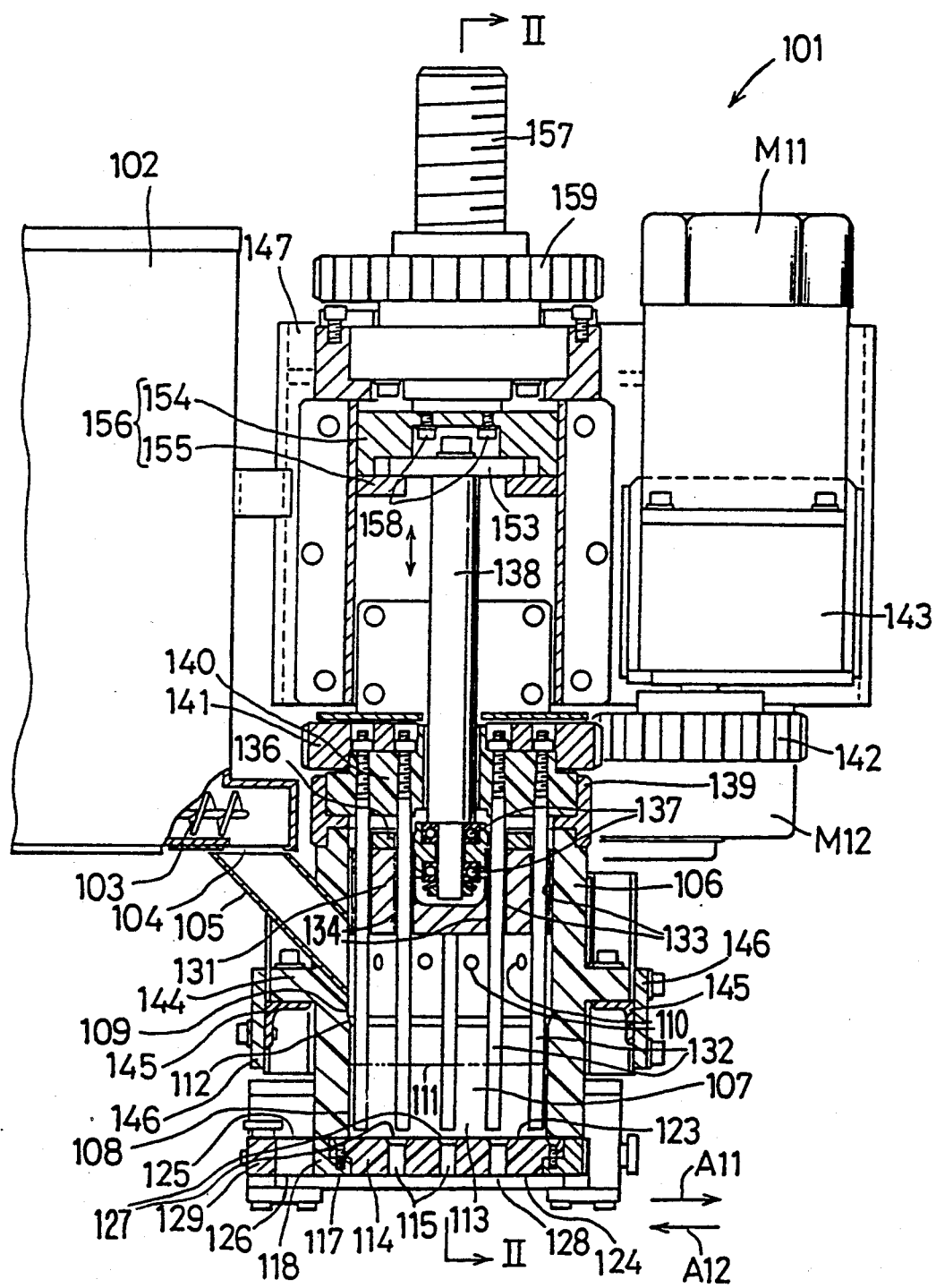
FIG. 10 is a sectional view illustrating an extrusion shaping device 101.
Figure 11:
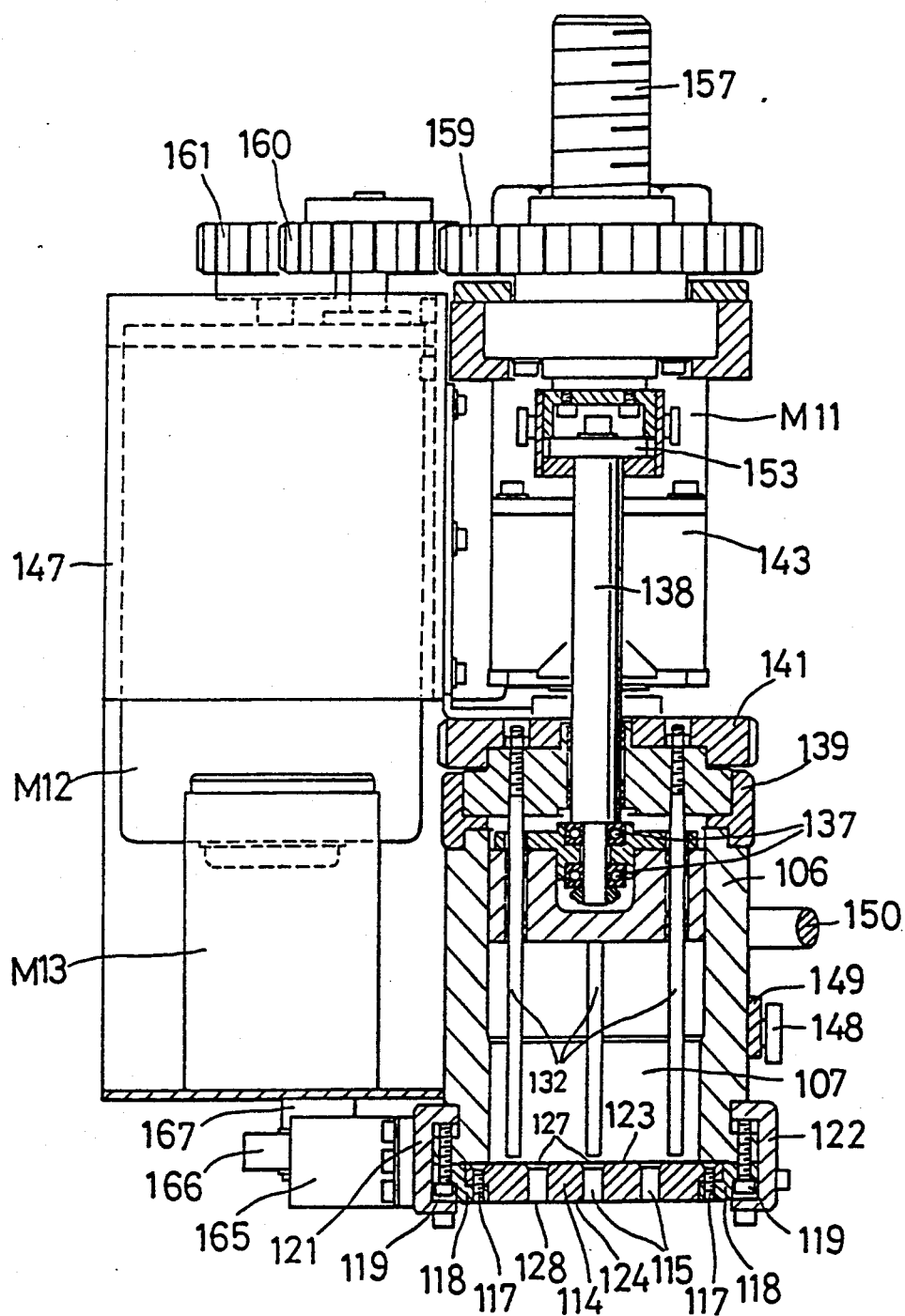
FIG. 11 is a sectional view taken along section line II—II of FIG. 10.
Figure 12:
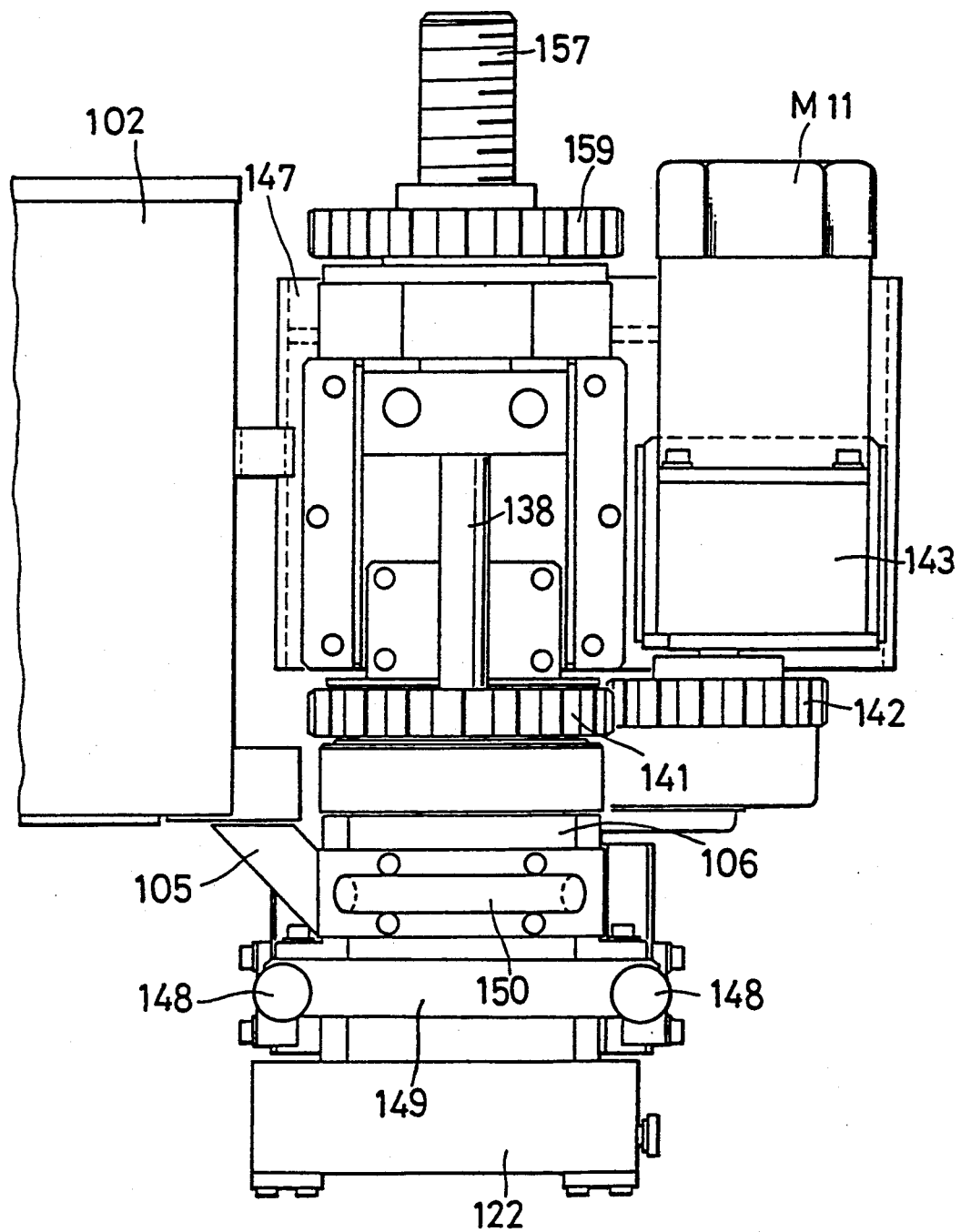
FIG. 12 is a front view of the extrusion shaping device 101.
Figure 13:
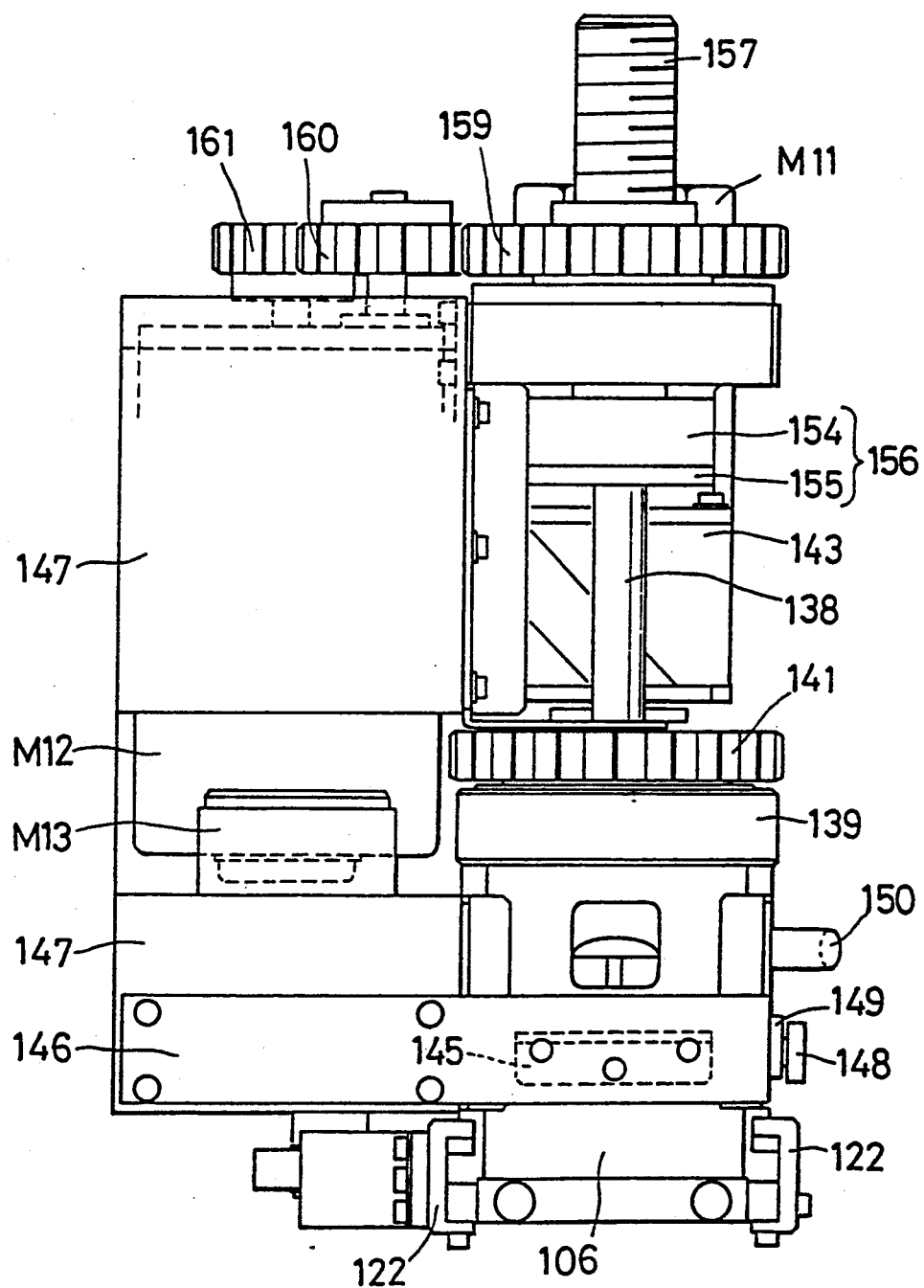
FIG. 13 is a side view of the extrusion shaping device 101 as seen from the left side in FIG. 12.

This embodiment is shown in FIGS. 9 to 16. FIG. 9 is a sectional view illustrating the whole construction of the embodiment, in which the shaper 5 shown in FIG. 1 is replaced with another extrusion shaper 101, such as is shown in FIG. 10. FIG. 10 is a sectional view illustrating the extrusion shaper 101. FIG. 11 is a sectional view taken along section line II—II of FIG. 10. FIG. 12 is a front view of the extrusion shaper 101. FIG. 13 is a side view of the extrusion shaper 101 as seen from the left side of FIG. 12. In a storage container 102, powder obtained by pulverizing and drying potatoes or the like is stored. The powder is transferred toward an outlet 104 by a screw conveyor 103 which is disposed at the lower portion of the storage container 102, and then supplied through a pipe conduit 105 to a mixing chamber 107 of a casing 106.

The casing 106 is made of a synthetic resin and has a right cylindrical inner surface 108 and an inner surface 109 which is slightly greater in diameter than the inner surface 108. The casing 106 is provided with a water supply hole 110 which opens on the inner surface 109 and supplies water from the storage container 102. From the storage container 102, about 50 g of the powder is supplied in each extrusion process, and about 100 cc of water is supplied from the water supply hole 110. The powder and water are supplied until they reach the level in the mixing chamber 107 indicated by an imaginary line 111 of FIG. 10, and are not supplied over the slope 112 which connects the inner surface 108 with the inner surface 109.

At the lower end of the casing 106, a bottom plate 114 is disposed to close an opening 113 which opens downward. The bottom plate 114 is made of, for example, a synthetic resin, and is provided with a plurality of extrusion holes 115. The bottom plate 114 has the shape of, for example, a circle, and is fixed by screws 117 to a frame member 118 which is secured to the casing 106 by bolts 119. At the lower end of the casing 106, a pair of approximately C-like holding members 121 and 122 are disposed so as to face toward each other. The casing 106 is united with the bottom plate 114 and frame member 118 by these holding members 121 and 122.

The bottom plate 114 has a first surface 123 which faces the mixing chamber 107, and a second surface 124 which faces the outside (note the lower portion of FIGS. 10 and 11). A pair of shutter plates 125 and 126 are respectively provided along the surfaces 123 and 124. The shutter plates 125 and 126 are driven to displace in the directions of arrows A11 and A12, and respectively have a plurality of through holes 127 and 128 which correspond to the extrusion holes 115. The shutter plates 125 and 126 are fixed to a connecting member 129, which connects the holding member 121 with the holding member 122, so as to move unitedly in the directions of arrows A11 and A12.

An extrusion member 131 is accommodated in the casing 106. The extrusion member 131 has a right cylindrical outer surface and can be inserted along the inner surface 108. Through holes 133 are formed in the extrusion member 131. A plurality of bar-like stirring members 132 respectively pass through the holes 133. A guide bush 134 is fitted between an inner surface of each of the through holes 133 and an outer surface of the respective stirring member 132, thereby, in the process of extruding the mixture, guiding the stirring member and preventing the mixture from entering into the gap formed between the inner surface of the through holes 133 and the outer surface of the stirring member 132. A supporting member 136 having two vertically arranged thrust bearings 137 is fixed to the extrusion member 131, and rotatably supports the extrusion member 131 with the thrust bearings 137 so that the extrusion member 131 can rotate about the rotation axis of a liftable shaft 138.

A rotor 140 made of a synthetic resin is supported on the upper end of the casing 106 through a pedestal 139 made of, e.g., aluminum. The stirring members 132 are fixed at one of their longitudinal ends to the rotor 140.

A first gear 141 is coaxially fixed to the rotor 140. With respect to the liftable shaft 138, the first gear 141 and the rotor 140 are rotatable and movable in the shaft direction. The first gear 141 engages with a second gear 142 so that speed-reduced power is transmitted through a reduction gear 143 from a stirring motor M11.

The casing 106 has a flange 144 which extends outward in the radial direction and is supportingly mounted on a supporting member 145 made of an angle iron or the like. The supporting member 145 is fixed to a pair of arms 146 which are secured to a base plate 147. A fall-preventing member 149 is detachably attached by a bolt 148 to the free end (the end at the right side of FIG. 13) of each of the arms 146. When the bolts 148 are loosened and the fall preventing members 149 are detached from the arms 146, the casing 106 can be removed, thereby allowing washing or the like to be done. In order to facilitate the removing of the casing 106, it is provided with a handle 150.

Figure 14:
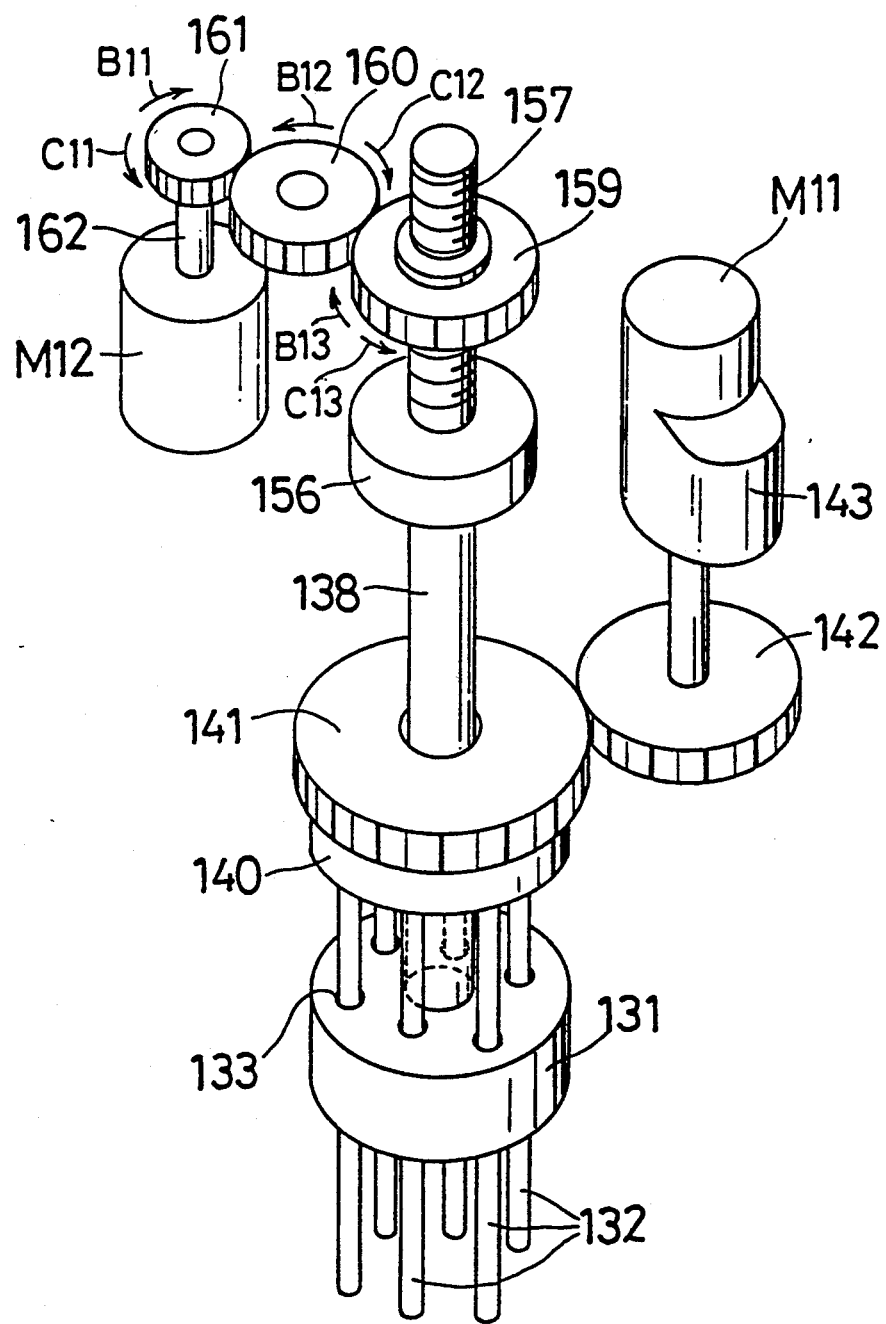
FIG. 14 is a simplified perspective view illustrating a construction for driving an extrusion member 131 and a stirring member 132.

Referring to FIGS. 10 and 14, a clutch disc 153, which is sandwiched by a clamping member 156 consisting of a pair of clamping pieces 154 and 155, is disposed at the upper end of the liftable shaft 138. The clamping pieces 154 and 155 are detachably connected to each other by bolts or the like. To the upper clamping piece 154, the lower end of a pole screw 157 is fixed by bolts 158, and it is so constructed that the clutch disc 153 prevents the rotation of the liftable shaft 138 from being transmitted to the pole screw 157. The pole screw 157 is inserted through a third gear 159 and engages with an inside screw formed on the inner surface of the third gear 159. The third gear 159 engages with a fourth gear 160, which in turn engages with a fifth gear 161. The fifth gear 161 is fixed to output shaft 162 of a lifting motor M12.

When the lifting motor M12 is energized, the output shaft 162 is driven to rotate around its rotation axis, and therefore the third to fifth gears 159, 160 and 161 are driven to respectively rotate in the directions of arrows B11, B12 and B13, thereby raising the pole screw 157 and liftable shaft 138 in the shaft direction. This causes the extrusion member 131 to move upward. When the output shaft 162 of the lifting motor M12 is driven to rotate in the reverse direction, the third to fifth gears 159, 160 and 161 are driven to respectively rotate in the directions of arrows C11, C12 and C13, thereby lowering the pole screw 157 and the liftable shaft 138. This causes the extrusion member 131 to move so as to extrude downward the mixture of the mixing chamber 107 through the extrusion holes 115.

Figure 15:
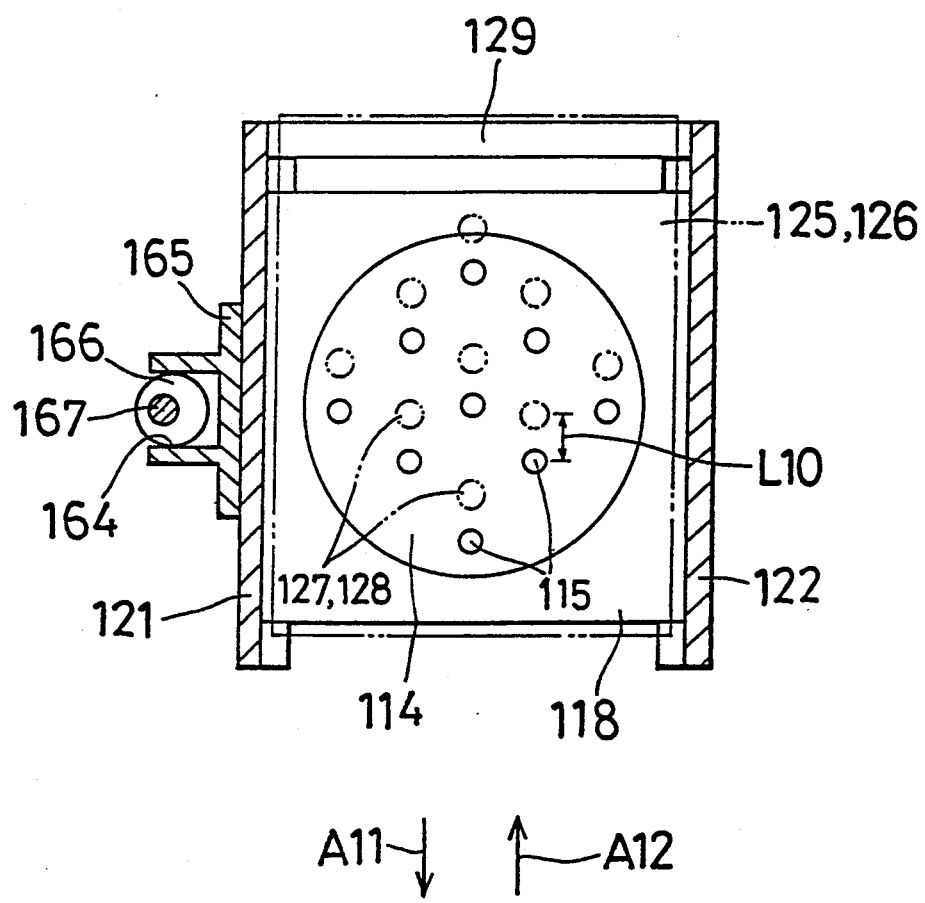
FIG. 15 is a view illustrating a construction for displacing shutter plates 125 and 126 in a simplified manner.

FIG. 15 is a simplified horizontal sectional view illustrating the construction of the shutter plates 125 and 126 and the components related thereto. As described above, in the shutter plates 125 and 126, the through holes 127 and 128 are respectively formed in such a manner that they are separated from the extrusion holes 115 of the bottom plate 114 by a distance L10 in the displacement direction A11 or A12. Both ends of the connecting member 129, to which the shutter plates 125 and 126 are attached, are connected to the pair of clamping members 121 and 122. To the longitudinal center portion of the clamping member 121 is fixed a cam receiving piece 165 having a cam groove 164 into which a cam 166 is fitted. The cam 166 is fixed to the output shaft 167 of a motor M13 for opening and closing the shutter plates 125 and 126. When the output shaft 167 is rotated by a predetermined angle, for example, 90 deg. in a given direction, the shutter plates 125 and 126 are opened or closed.

Figure 16A:
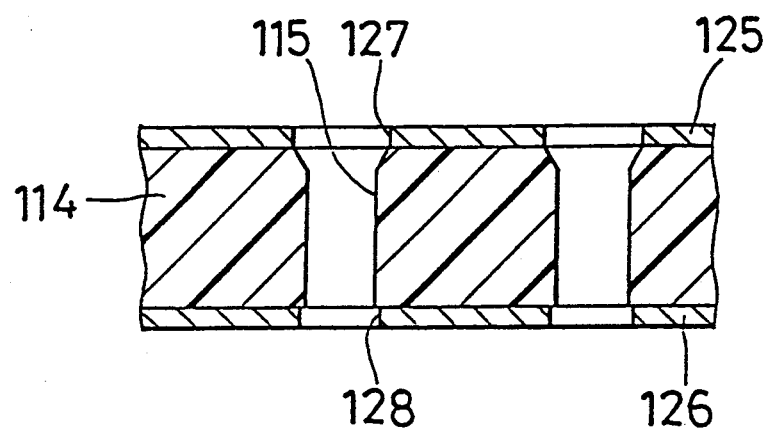
FIGS. 16(A) and (B) are sectional views illustrating the operation of the shutter plates 125 and 126.
Figure 16B:
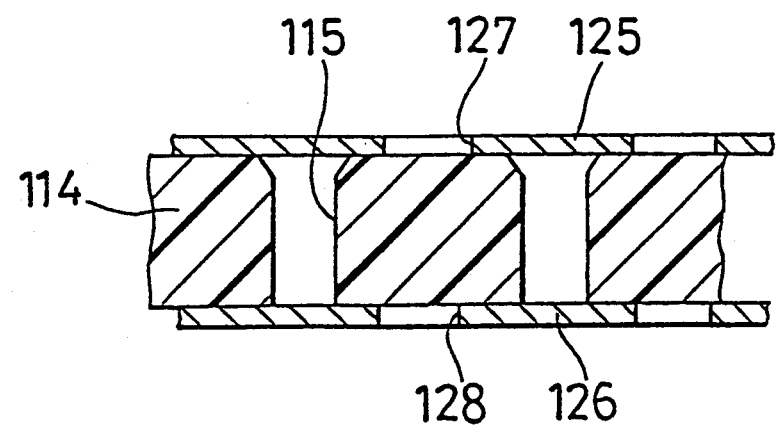

In response to a control signal from a control unit (not shown), which is embodied by a microcomputer or the like, the screw conveyor 103 is driven to supply an amount (e.g., about 50 g) of powder in the storage container 102 into the mixing chamber 107 through the pipe conduit 105. Then, for example, 100 cc of water is supplied from the water supply hole 110, and the stirring motor M11 is energized. The power of the motor transmitted via the first and second gears 141 and 142 drives the stirring members 132 passing through the extrusion member 131, which is upwardly retracted in the casing 106, so that the powder and water in the mixing chamber 107 are stirred at, e.g., 100 to 200 rpm for 7 to 8 seconds. After the stirring operation of the stirring members 132 is stopped, the mixture is allowed to stand for about 30 to 40 seconds. Thereafter, the lifting motor M12 is energized, and the power of the motor, transmitted via the third to fifth gears 159 to 161, is applied to the pole screw 157 to lower the screw so that the extrusion member 131 presses the mixture in the mixing chamber 107. At this time, as shown in FIG. 16(A), the extrusion holes 115 of the extrusion member 131 are respectively communicated with the through holes 127 and 128 of the shutter plates 125 and 126. In this state, the mixture is extruded downward, and the opening and closing motor M13 is energized to displace the shutter plates 125 and 126 in the direction of arrow A11. This causes the lower shutter plate 126 to cut off the mixture at the lower end of the extrusion holes 115, and the upper shutter plate 125 to prevent the mixture from further entering into the extrusion holes 115. Although the mixture remains in the extrusion holes 115, therefore, the remaining mixture is prevented in a sealed condition from through the lower shutter plate 126. In this way, the mixture is extruded from the extrusion holes 115 at a speed of, for example, 2 to 4 cm second.

As described above, since the mixture obtained by stirring powder and water can be extruded to be shaped, the process of shaping the mixture can be performed rapidly. Since the mixture is obtained by stirring powder and water, moreover, the powder can be stored in the storage container 102 so that freshness of the powder can be prevented from lowering.

In the embodiment, powder and water are stirred in the mixing chamber to be mixed, and, after the shutter plates are displaced, the mixture is extruded from the extrusion holes to be shaped. According to the embodiment, therefore, the process of extruding and shaping the mixture can be readily and rapidly performed. Since powder and water are separately supplied, the powder can be stored for a long period of time, and the freshness of the powder can be prevented from deteriorating.

According to the embodiment, moreover, it is not necessary to store materials in a freezer in order to prevent the reduction of freshness or rottenness from occurring, as is the case for commercial frozen foods. Hence, the present apparatus can provide the desired amount of an extruded product at a desired time. It is not necessary to additionally provide a preserving device such as a freezer, and therefore the space for installing such a device is not required, with the result that the apparatus of the invention is very simple in construction and has a remarkably increased storage capacity. According to the embodiment, immediately after powder and water are directly supplied to the mixing chamber and stirred therein, the extrusion process is conducted, whereby the productivity of extrusion products can be greatly improved and the mixture is kept unexposed to the air, resulting in that dust is prevented from entering into the mixture and it is possible to attain a very high cleanness.

EMBODIMENT 3

Figure 17:
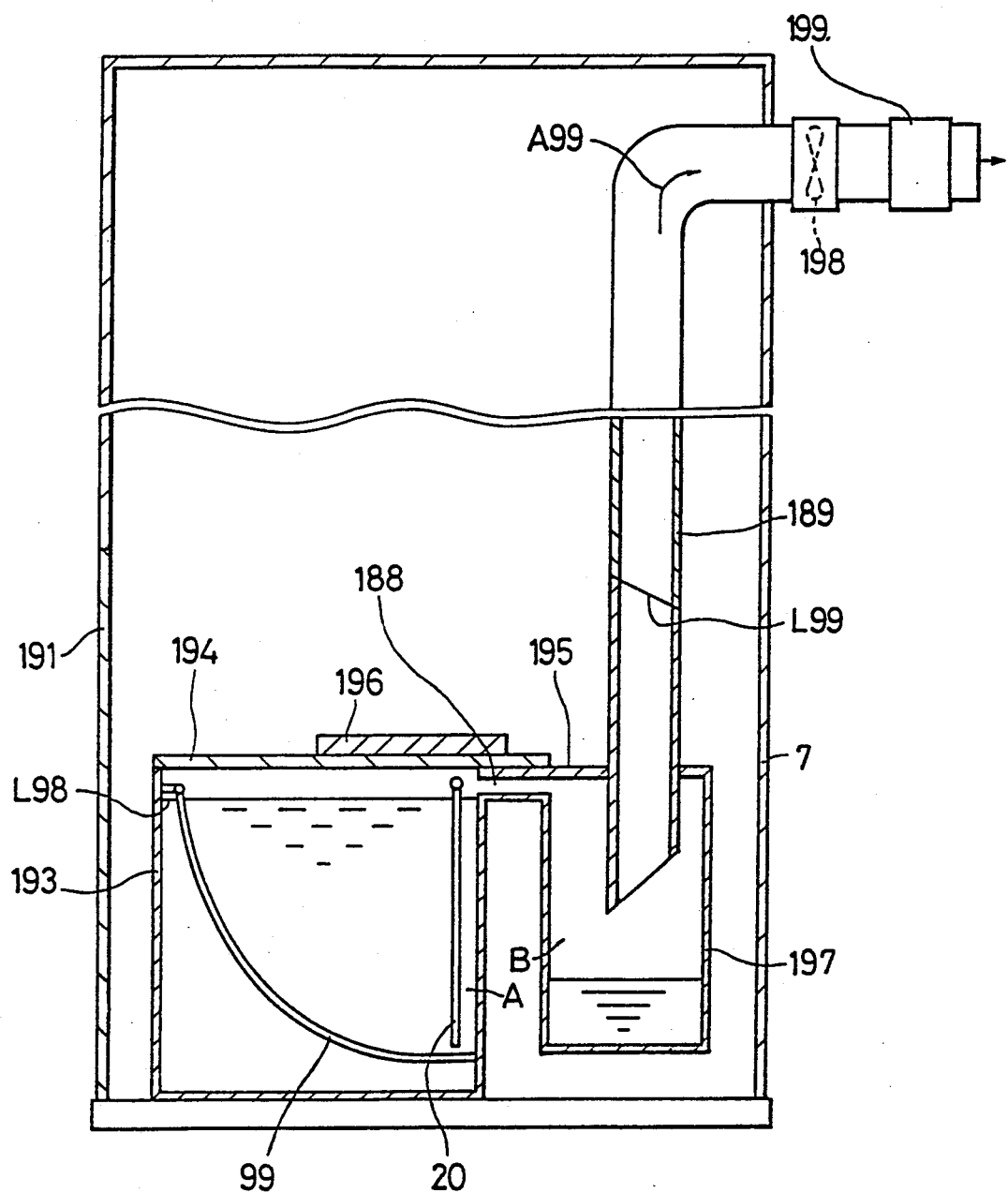
FIG. 17 is a sectional view illustrating a heating device used in a third embodiment of the invention.

FIG. 17 is a sectional view illustrating a heater used in another embodiment of the invention. The corresponding portions not shown in FIG. 17 are the same as the corresponding portions in the embodiment as shown in FIGS. 1-8.

In the casing 7, an oil storage tank 193 for storing liquid edible oil 193 is accommodated, which is able to be replaced by opening a door 191 which is able to be opened and closed.

The oil storage tank 193 is communicated with an auxiliary oil storage tank 197 through a communicating hole 188, which communicates between a storage space A and another storage space B. The oil is this able to flow from the tank 193 to the auxiliary tank 197. At the upper part of the auxiliary tank 197, a smoke emission duct 189 is attached. The upper part of the duct 189 is opened outside the housing 7. The duct 189 is provided with an induced draft fan 198 and a filter 199 for preventing air pollution. The smoke and steam or the like produced from the heating means 6 are emitted from the housing 7 through the duct 189.

The smoke emission duct 189 is separated at a sectional line L99, the lower part of the duct 189 being attached to the auxiliary tank 197 and open, facing the space B.

Therefore, when the tank 193 is replaced by opening the door 191, the auxiliary tank 197, which is connected to the tank 193 through the communicating hole 188, and the lower part of the duct 189, which is attached to the auxiliary tank 197, are also replaced with the tank 193. The sectional line L99 of the duct 189 is an oblique line which is upward as the line nears the door 191 of the housing 7, thereby it becoming possible to closely connect the lower part of the duct 189 to the upper part of the duct 189 when the tank 193 is accommodated in its predetermined place in the housing 7.

By providing the auxiliary tank 197, a waterdrop which may adhere to the inside of the duct 189 will drop into the auxiliary tank 197, thereby preventing the drop from dropping into the liquid edible oil in the tank 193. Consequently, any lowering of the quality of the oil is prevented.

In case the oil is spilt over a line L98, which is a lower inner surface of the communicating hole 188, the oil flows to the auxiliary tank 197 trough the communicating hole 188, therefore oil overflow from the tank 193 is prevented.

A movable cover 194 and a fixed cover 195 are disposed on the oil storage tank 193 and the auxiliary oil storage tank 197. The movable cover 194 is opened and closed by a driving means 196 provided with a rack, a pinion and a motor (not shown). The movable cover 194 is open when the mixture of powder and water drops. After the mixture drops, the movable cover 194 is closed and the induced draft fan 198 is driven. The movable cover 194 prevents floating dust in the air from entering into the oil storage tank 193. Smoke and steam or the like, produced by operating the heater 6, are emitted from the housing 7 to the outside through the smoke emission duct 189.

EMBODIMENT 4

Figure 18:
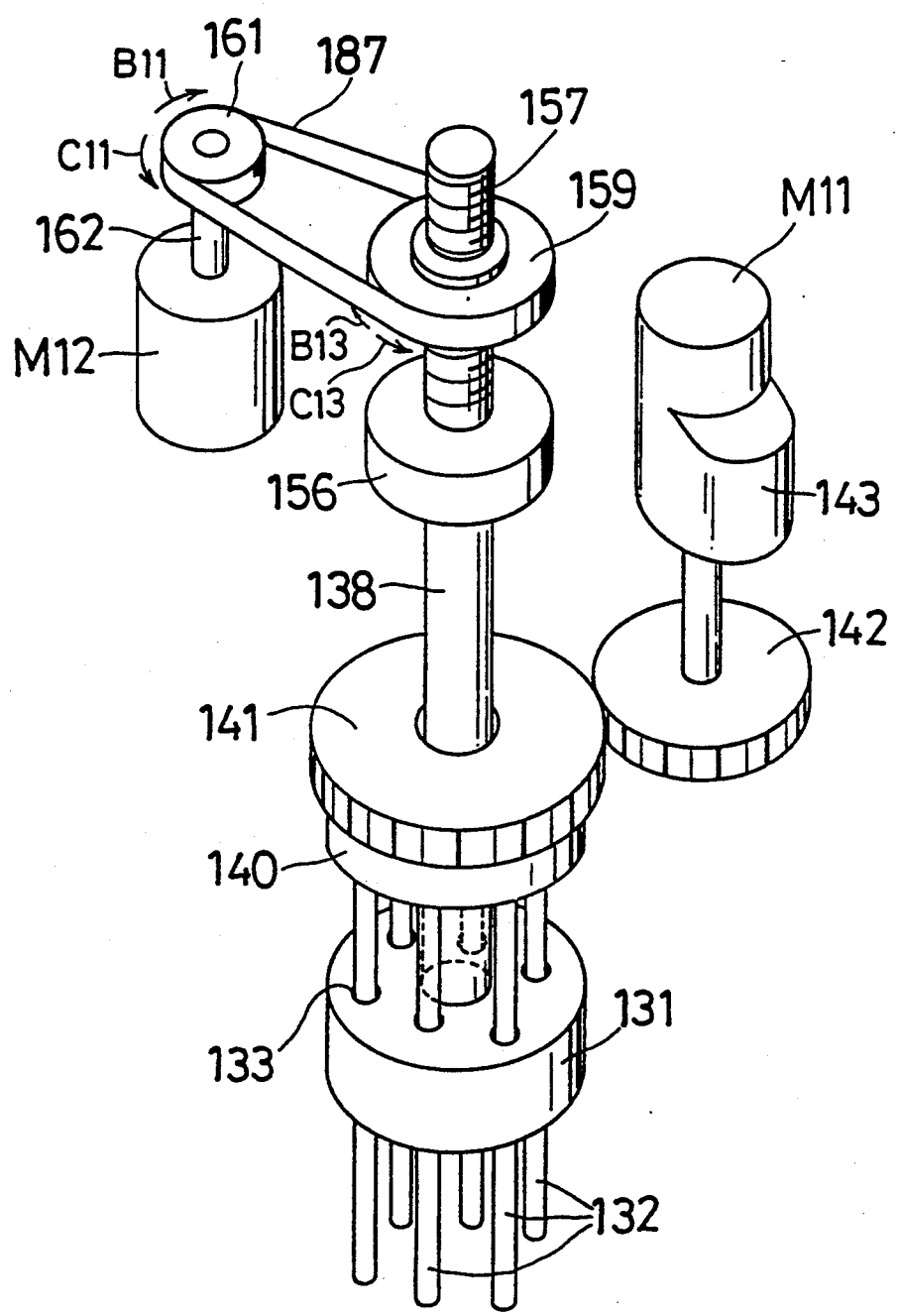
FIG. 18 is a simplified perspective view illustrating a construction for driving an extrusion member 131 and a stirring member 132 used in a fourth embodiment of the invention.

FIG. 18 is a simplified perspective view illustrating the construction for driving an extrusion member 131 and a stirring member 132 used in the second embodiment of the invention. In FIG. 18, instead of the fourth gear 160 in FIG. 14, there exists a belt 187 operatively connecting the third gear 159 and the fifth gear 161. The driving power produced by the motor M2 is transmitted through the fifth gear 161, which is fixed on the output shaft 162, through the belt 187 and through the third gear 159 to the liftable shaft 138.

According to the configuration, even when the driving power overloads the fifth gear 161 by a power overload, the belt is able to move idly since the belt is elastic, and consequently the gears 161 and 159 are prevented from being broken.

The portions not shown in FIG. 18 are the same as those portions in the embodiment as shown in FIGS. 1–8.

EMBODIMENT 5

Figure 19:
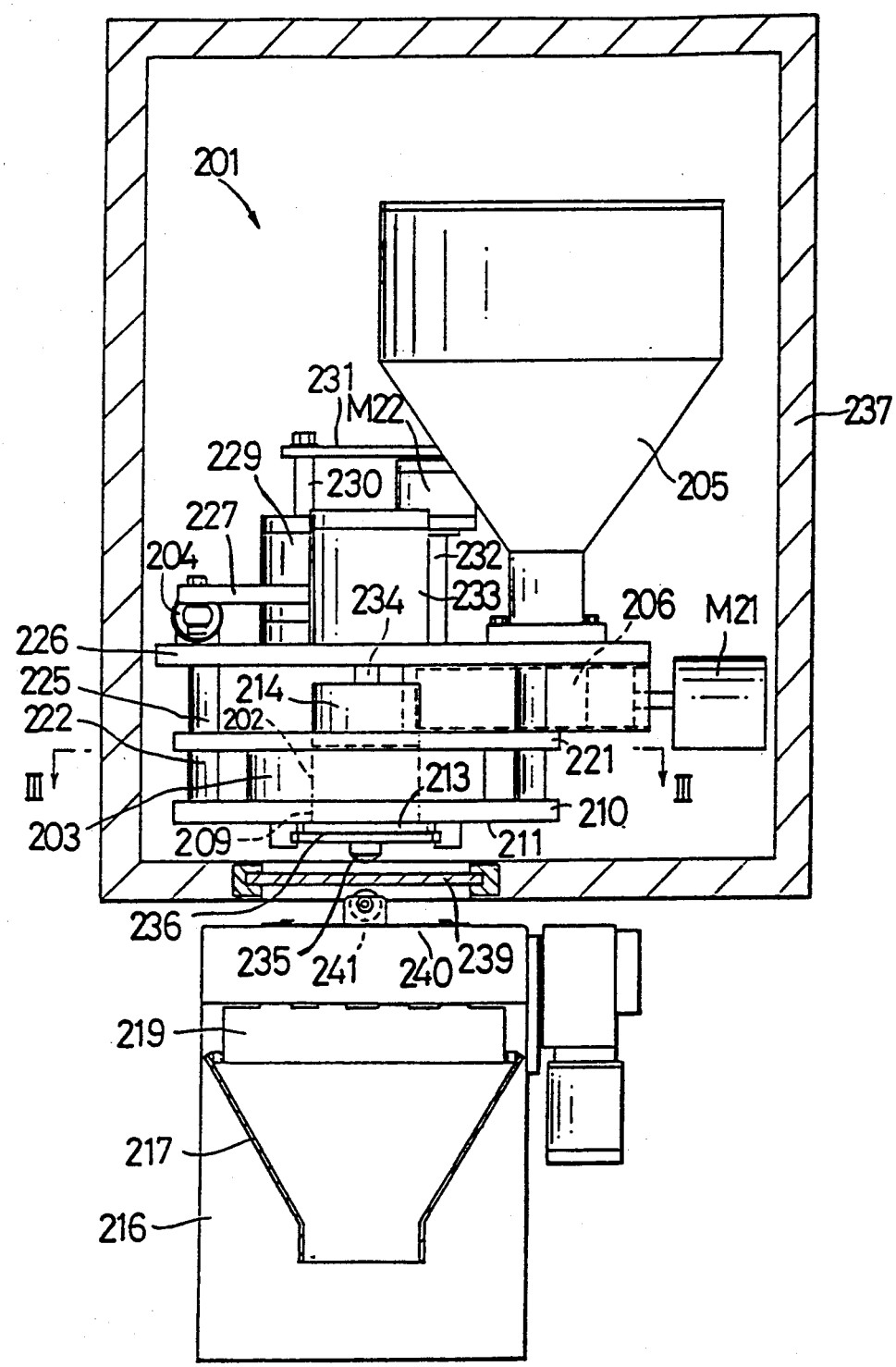
FIG. 19 is a sectional view illustrating the principle construction of a food production apparatus 201 in a fifth embodiment of the invention.
Figure 20:
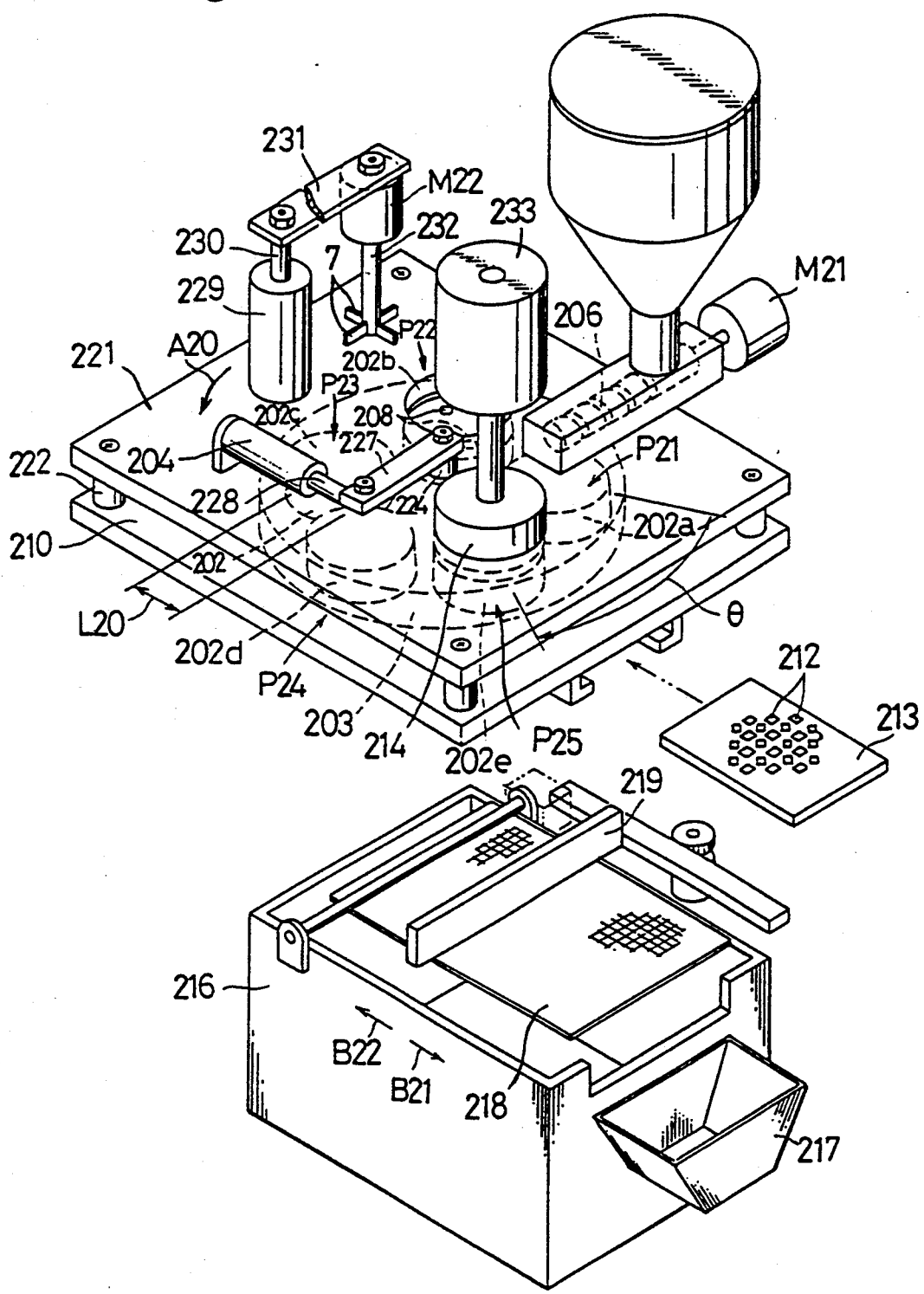
FIG. 20 is an exploded perspective view of one portion of the food production apparatus 201.
Figure 21:
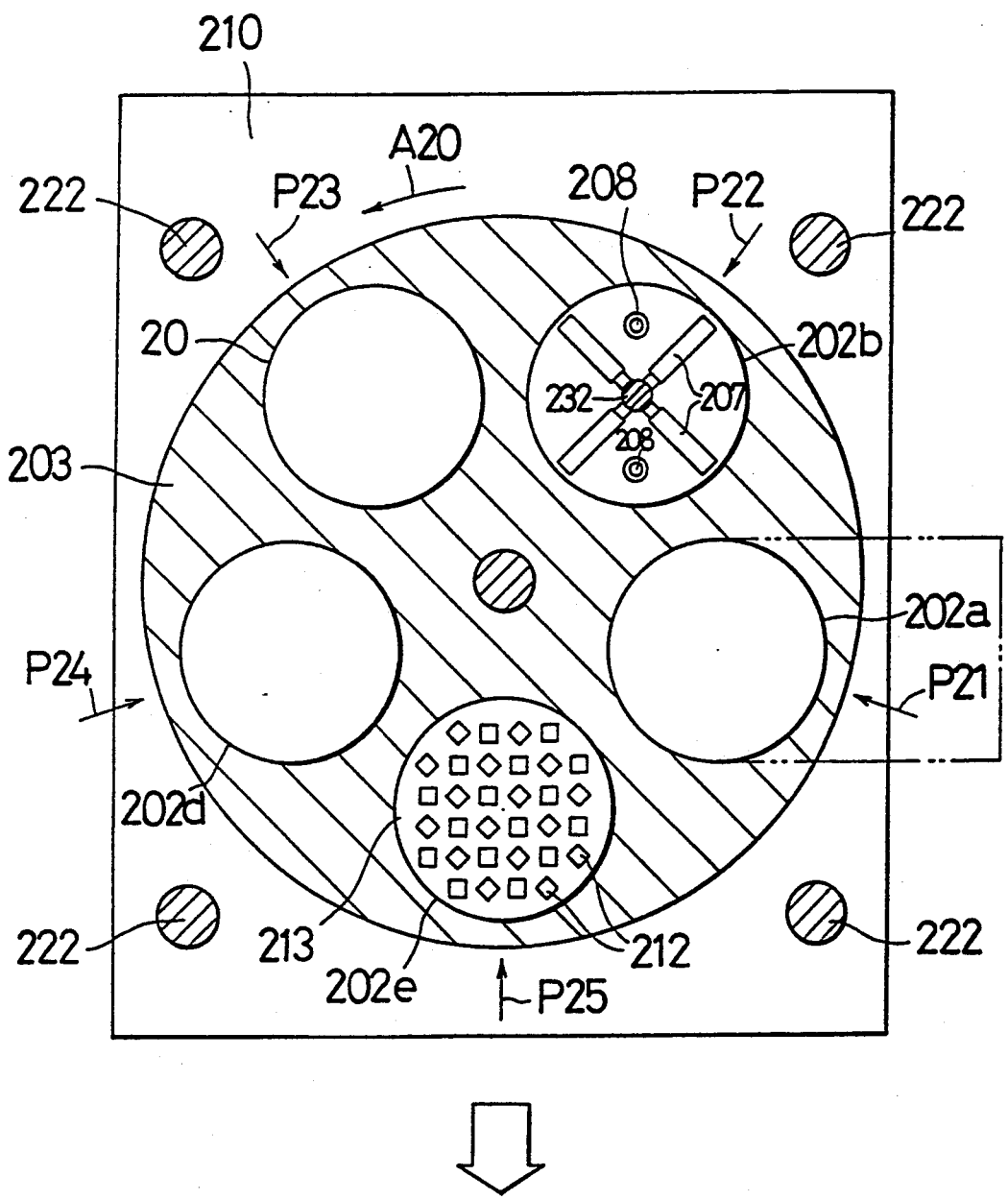
FIG. 21 is a sectional view taken along section line III—III of FIG. 19.

This embodiment is shown in FIGS. 19 to 21. FIG. 19 is a sectional view illustrating the principal construction of a food production apparatus 201. FIG. 20 is an exploded perspective view of the food production apparatus 201. In order to simplify the illustration, a base plate 226 is not shown in FIG. 20. The food production apparatus 201 principally comprises a disclike rotor 203 having a plurality of right cylindrical through holes 202 which are arranged in the circumferential direction at an equal interval. A double acting cylinder 204 intermittently drives the rotor 203 to rotate about its rotation axis in a predetermined rotation direction A20 while stopping at each of the stop positions which correspond to an interval $\theta$ of the through holes 202 (in the embodiment, $\theta = 72$ deg.). A screw conveyor 206 is a supplying device for supplying powder, obtained by pulverizing and drying potatoes or the like and stored in a hopper 205, to the through hole 202a, which is positioned at a supplying position P21 to which the powder is supplied. A blade member 207 is disposed in a through hole 202b positioned at a mixing position P22 which is downstream of the supplying position P21 in the rotation direction A20 of the rotor 203. The blade member 207 is able to be inserted into or retracted from the through hole 202b and rotated in the forward and reverse direction while reciprocating upward and downward in the through hole 202b. A bottom plate 210 on which the rotor 203 is mounted has a communicating hole 209 which communicates with a water supply hole 208 opening in the through hole 202b positioned at the mixing position P22 and a through hole 202e positioned at a shaping position P25, which is downstream of a mixing position P22 in the rotation direction A20. A shaping member 213 is detachably disposed on the lower surface of the bottom plate 210 so as to close the communicating hole 209, and has a plurality of extrusion holes 212 through which the mixture of the powder and water stirred by the blade member 207 passes. A right cylindrical extruding member 214, which passes through the through hole 202e and communicating hole 209 positioned at the shaping position P25, presses the mixture in the through hole 202e to extrude the mixture from the extrusion holes 212.

Immediately beneath the shaping position P25 of the food production apparatus 201 is disposed a heater 215 in which edible oil heated to, e.g., about 180° C. is stored, so that the shaped mixture extruded from the extrusion holes 212 of the shaping member 213 falls into the edible oil and is processed to fried potatoes therein. The heater 215 comprises a storage bath 216 for storing the edible oil. A chute 217 is fixed to one side of the storage bath 216. A net-like scooping member 218 which, when the mixture is extruded from the extrusion holes 212 and falls therefrom, sinks in the edible oil of the storage bath 216, and which further, after a predetermined period of time has elapsed, is subjected to angular displacement to become horizontal and above the level of the edible oil, thereby scooping the mixture pieces from the edible oil. A sweeping member 219 reciprocates to displace in the directions of arrows B21 and B22 and along the upper surface of the horizontal scooping member 218 to sweep the foods on the scooping member 218 into the chute 217.

A top plate 221 is mounted on the rotor 203. The top plate 221 and the bottom plate 210 are positioned in parallel to rotatably and watertightly sandwich the rotor 203, and are connected to each other using bolts or the like and a plurality of connectors 222, which are disposed at the corners of the plates. In the rotor 203, through holes 202c and 202d are formed at an angle $\theta$ and at a regular interval between the through holes 202b and 202e, and stop positions P23 and P24, which correspond respectively to the through holes 202c and 202d, are set.

The shaft 224 of the rotor 203 upwardly penetrates the base plate 226, which is supported on the upper surface of the top plate 221 through connectors 225, and is connected to one end of a swing lever 227 through a one-way clutch (not shown). The other end of the swing lever 227 is connected to a piston rod 228 of the double acting cylinder 204. The stroke L20 of the piston rod 228 is set in accordance with the angle $\theta$ formed in the circumferential direction by the through holes 202a to 202e. When the double acting cylinder 204 is operated so that the piston rod 228 extends by the stroke L20, therefore, the rotor 203 is angularly displaced by the angle $\theta$ in the direction of arrow A20. When the piston rod 228 withdraws, the swing lever 227 is angularly displaced in the direction opposite to that of arrow A20, but its turning force in the angular-displacement direction is prevented by the one-way clutch from being transmitted to the shaft 224, whereby the rotor 203 is prevented from rotating in the direction opposite to that of arrow A20.

The screw conveyor 206 is disposed between the base plate 226 and the top plate 221, and is driven by the motor M21 to rotate so as to conduct the operation of transferring the powder from the hopper 205 for a predetermined period of time, thereby supplying a predetermined amount of the powder to the through hole 202a at the supplying position P21. With the rotation of the rotor 203, the through hole 202a into which the powder has been supplied as described above is moved to the mixing position P22. In the mixing position P22, as shown in FIG. 19, when city water or the like is supplied from the water supply hole 208, and a piston rod 230 of a double acting cylinder 229 is withdrawn, a motor M22 connected to the piston rod 230 through a connecting member 231 is lowered, and the blade member 207 disposed at the lower end of the output shaft 232 of the motor M22 is inserted into the through hole 202a situated at the mixing position P22. In this state, the motor M22 is energized to rotate the output shaft 232 about the rotation axis in the forward and reverse directions for a predetermined period, and the piston rod 230 of the double acting cylinder 229 repeats the extension and retraction operations, so that the blade member 207 reciprocates upward and downward in the through hole 202a. The number of revolutions of the blade member 207 is selected to be, for example, about 30 rpm.

After the powder and water are stirred and mixed in the through hole 202a at position P22, the blade member 207 is upwardly withdrawn with the extension operation of the double acting cylinder 229. In this state, the rotor 203 is further angularly-displaced by the angle $\theta$ in the direction A20, and the through hole 202a is located at a stand-by position P23, and remains stopped at this position until the operation of supplying the powder into the through hole 202d at the supply position P21 and the mixing operation of the through hole 202e at the mixing position P22 have been completed. Thereafter, the rotor 203 is further rotated in the downstream direction A20, and the through hole 202a is located at the shaping position P25. Then a piston rod 234 of a double acting cylinder 233 extends downward so that the extrusion member connected to the tip of the piston is inserted into the communicating hole 209 and the through hole 202a. This causes the mixture in the through hole 202a to be extruded from the extrusion holes 212 of the shaping member 213. When the length of the thus extruded mixture reaches a predetermined value, a cutting wire 236 is displaced forward and backward (i.e., in the direction perpendicular to the paper in FIG. 19) by a double acting cylinder 235, resulting in that the portions of the mixture hanging from the extrusion holes 212 are cut off at the lower surface of the shaping member 213 and fall into the storage bath 216. At this time, a shutter plate 239 disposed at the bottom of a housing 237 is driven by a driving device (not shown) such as a double acting cylinder to its open state. Also, a shutter plate 240 disposed at the upper portion of the storage bath 216 is driven by a double acting cylinder 241 to its open state. In this way, the provision of the shutter plate 239 prevents floating dust in the air from entering into the housing 237, and the provision of the shutter plate 240 prevents floating dust in the air from entering into the storage bath 216. The shaping member 213 is attached to the lower surface 211 of the bottom plate 210 with bolts (not shown) or the like. Hence, the shaping member 213 can be replaced with another shaping member provided with extrusion holes 212 which have another shape, so that the mixture can be extruded into a desired shape.

The mixture extruded and falling from the extrusion holes 212 into the storage bath 216 is immersed into the edible oil to be fried. The mixture which has been immersed in the edible oil for a predetermined period of time is raised by the upward displacement of the scooping member 218 and then swept by the sweeping member 219 into the chute 217 to be accommodated in a container previously disposed below the chute.

As described above, since the powder and water are stirred to be mixed, and then the mixture is extruded, the series of processes can be conducted continuously. According to the embodiment, therefore, it is possible to expedite the processes of producing foods and construct the apparatus in a small size.

In the embodiment described above, the storage bath 216 stores heated edible oil, and the shaped mixture is fried therein. In another embodiment of the invention, alternatively, the storage bath 216 may store hot water instead of edible oil so as to boil a mixture shaped and falling therein.

In a further embodiment of the invention, the powder may include baking powder in addition to wheat flour. Alternatively, the food production apparatus of the invention may be designed for producing doughnuts or fried bread.

In a further embodiment of the invention, powder of a chicken may be used as the powder.

In a still further embodiment of the invention, means for supplying a spice or the like may be provided at each of the stop positions P23 and P24.

As described above, in the embodiment, the supplying means supplies powder into the through holes of the rotor, the rotor is rotated, the blade member stirs the powder and water to mix them, and then the thus obtained mixture is extruded from the extrusion holes. Therefore, the series of processes can be conducted continuously, and it is not necessary for the operator to carry a shaped mixture to another place. This surprisingly improves the productivity, and prevents the apparatus from becoming large. Accordingly, the present apparatus does not require a large space for installation, and can be widely used as, for example, an automatic vending machine or the like.

The invention may be embodied in other specific forms without departing from the spirit or essential characteristics thereof. The present embodiments are therefore to be considered, in all respects, as illustrative and not restrictive, the scope of the invention being indicated by the appended claims rather than by the foregoing description and all changes which come within the meaning and the range of equivalency of the claims are therefore intended to be embraced therein.

What is claimed is:

1. A food production apparatus, comprising:
a shaping means for combining water and a powder, mixing the water and powder and extruding the mixture in a predetermined shape, said shaping means comprising:
a cylindrical casing defining a mixing chamber and a downwardly directed opening,
a hopper connected to said cylindrical casing for storing and supplying a powder,
a conveyor in said cylindrical casing for transferring powder from said hopper to said mixing chamber,
a blade member driven to rotate in forward and reverse directions about a rotation axis in said mixing chamber and to vertically move along said rotation axis,
a shutter member closing said opening of said cylindrical casing, said shutter member including a water supply portion having a water supply hole for supplying water to said mixing chamber and an extrusion portion having a plurality of extrusion holes therein, wherein said shutter member is moveable between a first position in which said water supply hole communicates with said mixing chamber and a second position in which said extrusion holes communicate with said mixing chamber, and
a means for driving said shutter member between said first and second positions; and
a heating means for heating the shaped mixture extruded from said shaping means, said heating means comprising:
a storage bath for storing a liquid therein, a temperature regulating means for heating the liquid in said storage bath and for maintaining the temperature of the liquid at a predetermined value, a scooping member disposed in said storage bath so as to be moveable above and below the level of the liquid in said storage bath, said scooping member having a plurality of openings therein, and a sweeping member driven to move along an upper surface of said scooping member when said scooping member is positioned at an upper limit position above the level of the liquid in said storage bath.

2. The food production apparatus of claim 1, wherein said conveyor is a screw conveyor.

3. The food production apparatus of claim 1, wherein said storage bath has a wire net therein arcing from a low portion of said storage bath toward the upper portion thereof, and wherein said scooping member is pivotably mounted to follow said wire net between vertical and horizontal positions, the horizontal position being said upper limit position above the level of the liquid in said storage bath.

4. The food production apparatus of claim 1, wherein said shutter member is slidably mounted on said cylindrical casing covering said opening for slidable movement between said first and second positions.

5. A food production apparatus, comprising:

a shaping means for combining water and a powder, mixing the water and powder and extruding the mixture in a predetermined shape, said shaping means comprising:

a cylindrical casing defining a mixing chamber and a downwardly directed opening, a bottom plate closing said opening of said casing, said bottom plate having a plurality of extrusion holes therein and first and second surfaces on which said extrusion holes open, said first surface facing said mixing chamber and said second surface being parallel with said first surface and facing away from said mixing chamber, a pair of shutter plates movably disposed on respective said first and second surfaces of said bottom plate, each said shutter plate having a plurality of through holes corresponding to and communicable with said extrusion holes, a press member mounted so as to be movable in said casing toward and away from said bottom plate, said press member further having a central axis about which said press member is rotatable, and a stirring member extending through said press member and projecting into said mixing chamber; and a heating means for heating the shaped mixture extruded from said shaping means, said heating means comprising:

a storage bath for storing a liquid therein, a temperature regulating means for heating the liquid in said storage bath and for maintaining the temperature of the liquid at a predetermined value, a scooping member disposed in said storage bath so as to be moveable above and below the level of the liquid in said storage bath, said scooping member having a plurality of openings therein, and a sweeping member driven to move along an upper surface of said scooping member when said scooping member is positioned at an upper limit position above the level of the liquid in said storage bath.

6. The food production apparatus of claim 5, wherein said stirring member comprises a plurality of bars connected to a rotor, said bars extending slidably through said press member into said mixing chamber, and said rotor being connected to a drive means for rotating said rotor.

7. The food production apparatus of claim 5, wherein said shutter plates are fixed relative to each other.

8. The food production apparatus of claim 5, wherein said storage bath has a wire net therein arcing from a low portion of said storage bath toward an upper portion thereof, and wherein said scooping member is pivotably mounted to follow said wire net between vertical and horizontal positions, the horizontal position being said upper limit position above the level of the liquid in said storage bath.

9. The food production apparatus of claim 5, wherein said storage bath has a wire net therein arcing from a low portion of said storage bath toward an upper portion thereof, and wherein said scooping member is pivotably mounted to follow said wire net between vertical and horizontal positions, the horizontal position being said upper limit position above the level of the liquid in said storage bath.

10. A food production apparatus, comprising:

a shaping means for combining water and a powder, mixing the water and powder and extruding the mixture in a predetermined shape, said shaping means comprising:

a rotor having a plurality of through holes at regular intervals in a circumferential direction of said rotor, means for intermittently driving said rotor to rotate about a central axis thereof such that said rotor stops said through holes thereof at a plurality of stopping positions, means for supplying powder into one of said through holes when said through hole is stopped at a first said stopping position, a blade member mounted so as to be rotatable and upwardly and downwardly reciprocable into and out of a said through hole positioned at a second stopping position downstream of the first said stopping position, a bottom plate on which said rotor is mounted, said bottom plate having a water supply hole and a communicating hole therein, said water supply hole being positioned so as to communicate with a said through hole when the said through hole is positioned at said second stopping position, and said communicating hole being positioned so as to communicate with a said through hole positioned at a third stopping position downstream of said second stopping position, a shaping member detachably disposed on a lower surface of said bottom plate closing said communicating hole, said shaping member having a plurality of extrusion holes therethrough, and an extrusion member at said third stopping position for pressing a mixture in a said through hole at said third stopping position through said shaping member; and a heating means for heating the mixture extruded from said shaping member by said extrusion member.

11. The food production apparatus of claim 10, wherein said heating means comprises:

a storage bath for storing a liquid therein, a temperature regulating means for heating the liquid in said storage bath and for maintaining the temperature of the liquid at a predetermined value, a scooping member disposed in said storage bath so as to be movable above and below the level of the liquid in said storage bath, said scooping member having a plurality of openings therein, and a sweeping member driven to move along an upper surface of said scooping member when said scooping member is positioned at an upper limit position above the level of the liquid in said storage bath.

12. The food production apparatus of claim 10, wherein said means for supplying powder includes a hopper and a conveyor.

13. The food production apparatus of claim 10, wherein said means for intermittently driving said rotor includes a double acting cylinder having a piston rod connected to a swing lever, said rotor having a shaft thereof connected to said swing lever through a one-way clutch.

* * * * *